US008543905B2

(12) United States Patent
Migos et al.

(10) Patent No.: US 8,543,905 B2
(45) Date of Patent: Sep. 24, 2013

(54) DEVICE, METHOD, AND GRAPHICAL USER INTERFACE FOR AUTOMATICALLY GENERATING SUPPLEMENTAL CONTENT

(75) Inventors: Charles J. Migos, San Bruno, CA (US); Jay Christopher Capela, Santa Cruz, CA (US); Markus Hagele, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 13/077,807

(22) Filed: Mar. 31, 2011

(65) Prior Publication Data

US 2012/0240025 A1   Sep. 20, 2012

Related U.S. Application Data

(60) Provisional application No. 61/452,614, filed on Mar. 14, 2011.

(51) Int. Cl.
*G06F 17/00* (2006.01)
(52) U.S. Cl.
USPC ............ 715/230; 715/208; 715/231; 715/259
(58) Field of Classification Search
USPC .......................... 715/230, 231, 232, 208, 259
See application file for complete search history.

(56) References Cited

U.S. PATENT DOCUMENTS

| | | | | |
|---|---|---|---|---|
| 7,779,347 | B2* | 8/2010 | Christiansen et al. | 715/230 |
| 8,261,183 | B2* | 9/2012 | Ramic et al. | 715/231 |
| 2003/0076352 | A1* | 4/2003 | Uhlig et al. | 345/738 |
| 2005/0132281 | A1* | 6/2005 | Pan et al. | 715/515 |
| 2005/0234891 | A1 | 10/2005 | Walther et al. | |
| 2006/0015811 | A1* | 1/2006 | Tanaka et al. | 715/531 |
| 2007/0214407 | A1* | 9/2007 | Bargeron et al. | 715/512 |
| 2008/0178074 | A1* | 7/2008 | Stallings | 715/249 |
| 2008/0222552 | A1* | 9/2008 | Batarseh et al. | 715/776 |
| 2008/0263067 | A1 | 10/2008 | Diederiks et al. | |
| 2009/0300530 | A1 | 12/2009 | Falchuk | |
| 2010/0017701 | A1* | 1/2010 | Bargeron et al. | 715/230 |
| 2010/0156913 | A1 | 6/2010 | Ortega et al. | |

OTHER PUBLICATIONS

Quizlet, "The best way to study languages, vocabulary, or almost anything," Quizlet.com, downloaded Dec. 2010, http://quizlet.com/, 1 page.

* cited by examiner

*Primary Examiner* — Stephen Hong
*Assistant Examiner* — Matthew Ludwig
(74) *Attorney, Agent, or Firm* — Morgan, Lewis & Bockius LLP

(57) ABSTRACT

An electronic device with a display and a touch-sensitive surface displays a portion of a document in a primary user interface for the document. The portion of the document includes a respective author-specified term. The respective author-specified term is associated with corresponding additional information supplied by an author of the document, and the corresponding additional information is not concurrently displayed with the author-specified term in the portion of the document. The device also receives a request to annotate the respective author-specified term in the portion of the document; and in response to the request to annotate the respective author-specified term: annotates the respective author-specified term in the primary user interface; and generates instructions for displaying, in a supplemental user interface for the document distinct from the primary user interface, the respective author-specified term and at least a portion of the corresponding additional information for the respective author-specified term.

28 Claims, 25 Drawing Sheets

500-A

100

Chapter 2 — 504

The nervous system is a complex network of nervous tissue that sends electrical and chemical signals. The nervous systems include the central nervous system (CNS) and the peripheral nervous system (PNS) together.

Central Nervous System — 506-1, 506-2

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae. — 506-3, 506-4

Regions of the Brain

506-n

The brain is the most complex organ in the body. The gallery in Figure 3 gives you a good overview. It contains about one hundred billion neurons each of which can be connected to tens of thousands of other neurons within the brain. It is the source of what makes us human; the conscious mind. The mind is the set of cognitive processes related to perception, interpretation, imagination, memories, and language. Beyond cognitive functions, the 508 — (Notes)

Chapter 2 — 504

The nervous system is a complex network of nervous tissue that sends electrical and chemical signals. The nervous systems include the central nervous system (CNS) and the peripheral nervous system (PNS) together.

Central Nervous System

512
514

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

506-2

Regions of the Brain

The brain is the most complex organ in the body. The gallery in Figure 3 gives you a good overview. It contains about one hundred billion neurons each of which can be connected to tens of thousands of other neurons within the brain. It is the source of what makes us human; the conscious mind. The mind is the set of cognitive processes related to perception, interpretation, imagination, memories, and language. Beyond cognitive functions, the Notes

Chapter 2 — 504

The nervous system is a complex network of nervous tissue that sends electrical and chemical signals. The nervous systems include the central nervous system (CNS) and the peripheral nervous system (PNS) together.

Central Nervous System

518   506-2   516

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Regions of the Brain

The brain is the most complex organ in the body. The gallery in Figure 3 gives you a good overview. It contains about one hundred billion neurons each of which can be connected to tens of thousands of other neurons within the brain. It is the source of what makes us human; the conscious mind. The mind is the set of cognitive processes related to perception, interpretation, imagination, memories, and language. Beyond cognitive functions, the 508 — ( Notes )

Chapter 2 — 504

The nervous system is a complex network of nervous tissue that sends electrical and chemical signals. The nervous systems include the central nervous system (CNS) and the peripheral nervous system (PNS) together.

Central Nervous System

506-2    516

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Regions of the Brain

The brain is the most complex organ in the body. The gallery in Figure 3 gives you a good overview. It contains about one hundred billion neurons each of which can be connected to tens of thousands of other neurons within the brain. It is the source of what makes us human; the conscious mind. The mind is the set of cognitive processes related to perception, interpretation, imagination, memories, and language. Beyond cognitive functions, the

544

542    (Quiz)

Chapter 2 — 504

The nervous system is a complex network of nervous tissue that sends electrical and chemical signals. The nervous systems include the central nervous system (CNS) and the peripheral nervous system (PNS) together.

Central Nervous System

The central nervous system (CNS) represents the largest part of the nervous system. The brain controls the nervous system. The spinal cord carries nerve impulses from the brain to the body and from the body to the brain. Together with the peripheral nervous system (PNS), it controls virtually every activity in the body. The brain is protected by the skull and the spinal cord is protected by the vertebrae.

Regions of the Brain

The brain is the most complex organ in the body. The gallery in Figure 3 gives you a good overview. It contains about one hundred billion neurons each of which can be connected to tens of thousands of other neurons within the brain. It is the source of what makes us human; the conscious mind. The mind is the set of cognitive processes related to perception, interpretation, imagination, memories, and language. Beyond cognitive functions, the Quiz

Figure 5M

DEVICE, METHOD, AND GRAPHICAL USER INTERFACE FOR AUTOMATICALLY GENERATING SUPPLEMENTAL CONTENT

RELATED APPLICATIONS

This application claims priority to U.S. Provisional Application Ser. No. 61/452,614, filed Mar. 14, 2011, entitled "Device, Method, and Graphical User Interface for Automatically Generating Supplemental Content," which is incorporated by reference herein in its entirety.

TECHNICAL FIELD

This relates generally to electronic devices with touch-sensitive surfaces, including but not limited to electronic devices with touch-sensitive surfaces that display primary content, such as an electronic book or other electronic document, and supplemental content, such as note cards and quizzes concerning the primary content.

BACKGROUND

The use of electronic books, such as electronic textbooks, has increased significantly in recent years. A person (e.g., a student) using the electronic book may want to create supplemental content, such as note cards and/or quizzes, to help improve or test the person's understanding of the content in the book.

But existing methods for generating supplemental content are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for generating supplemental content. Such methods and interfaces may complement or replace conventional methods for generating supplemental content. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method, performed at an electronic device having a display and a touch-sensitive surface, includes displaying a portion of a document in a primary user interface for the document. The portion of the document includes a respective author-specified term. The respective author-specified term is associated with corresponding additional information supplied by an author of the document, and the corresponding additional information is not concurrently displayed with the author-specified term in the portion of the document. The method also includes receiving a request to annotate the respective author-specified term in the portion of the document; and in response to the request to annotate the respective author-specified term: annotating the respective author-specified term in the primary user interface; and generating instructions for displaying, in a supplemental user interface for the document distinct from the primary user interface, the respective author-specified term and at least a portion of the corresponding additional information for the respective author-specified term.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by an electronic device with a display and a touch-sensitive surface, cause the device to perform the operations of the method described above. In accordance with some embodiments, an electronic device includes: a display; a touch-sensitive surface; and means for performing the operations of the method described above. In accordance with some embodiments, an information processing apparatus, for use in an electronic device with a display and a touch-sensitive surface, includes means for performing the operations of the method described above.

In accordance with some embodiments, an electronic device includes a display unit configured to display a portion of a document in a primary user interface for the document, the portion of the document including a respective author-specified term, where the respective author-specified term is associated with corresponding additional information supplied by an author of the document, and the corresponding additional information is not concurrently displayed with the author-specified term in the portion of the document; a touch-sensitive surface unit configured to receive user gestures; and a processing unit coupled to the display unit and the touch-sensitive surface unit. The processing unit is configured to receive a request to annotate the respective author-specified term in the portion of the document; and in response to the request to annotate the respective author-specified term: annotate the respective author-specified term in the primary user interface, and generate instructions for displaying, in a supplemental user interface for the document distinct from the primary user interface, the respective author-specified term and at least a portion of the corresponding additional information for the respective author-specified term.

Thus, electronic devices with displays and touch-sensitive surfaces are provided with faster, more efficient methods and interfaces for generating supplemental content, thereby increasing the effectiveness, efficiency, and user satisfaction with such devices. Such methods and interfaces may complement or replace conventional methods for generating supplemental content.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
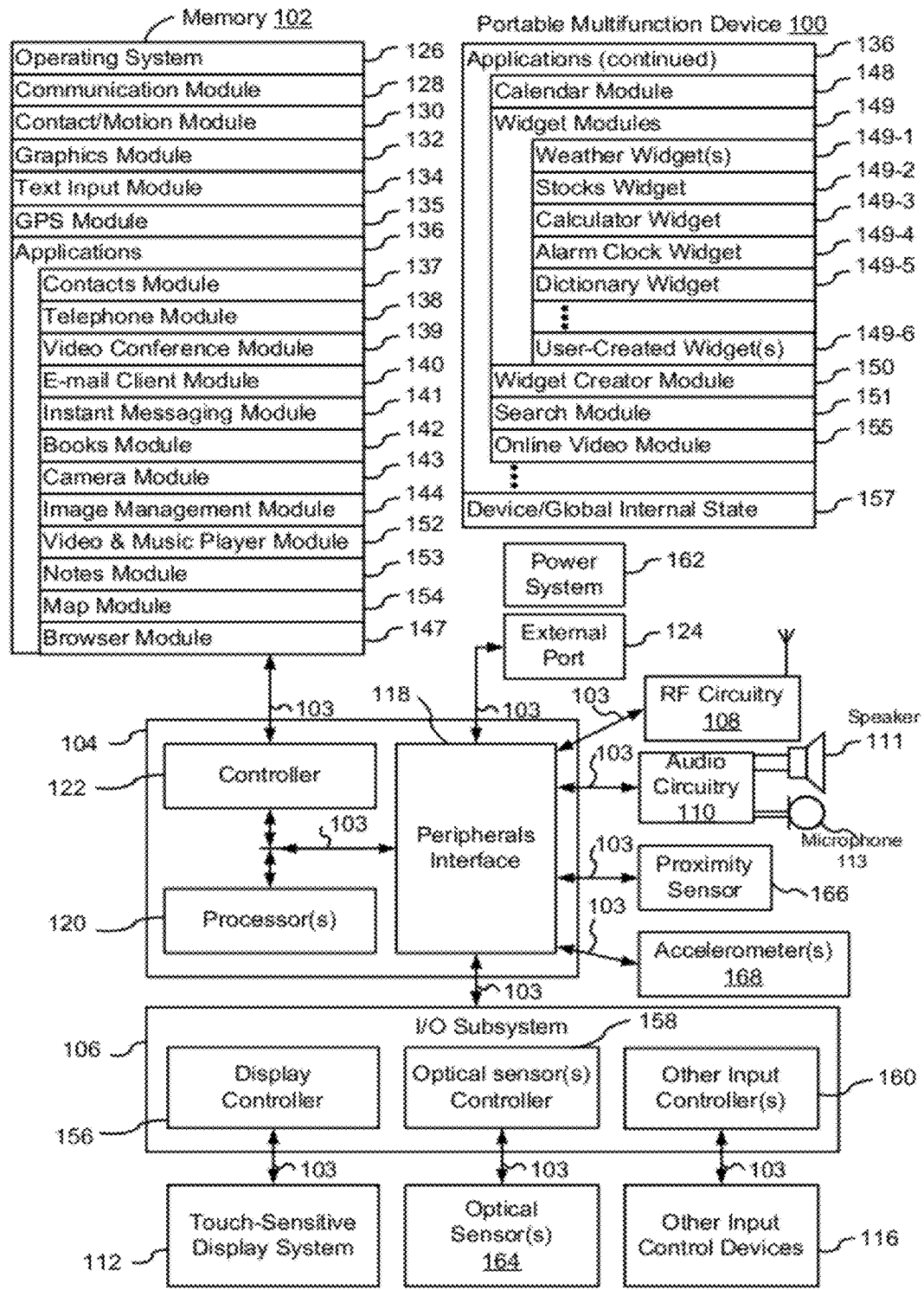
FIG. 1A is a block diagram illustrating a portable multifunction device with a touch-sensitive display in accordance with some embodiments.

Described below are devices and methods that enable generation of supplemental content such as note cards and quizzes from primary content such as an electronic book or other electronic document. For example, consider the scenario where a student is reading an electronic textbook for a class. The author of the textbook has specified key words or phrases that the author considers generally important for understanding the content of the book, but which may or may not be relevant to the student's particular class. The author has also supplied additional information about these key words, such as their definitions and/or additional examples of their use. In some cases, the additional information is displayed in a glossary at the end of the textbook. In other cases, the additional information is not displayed as part of the primary content of the book. As the student reads the textbook, the student annotates (e.g., highlights) particular words or passages that the student considers important. When the student's annotation includes a key word or phrase specified by the author, instructions are generated for displaying the key word and at least some of the additional information about the annotated key word in a supplemental user interface, such as a note card or quiz for the annotated key word. Thus, note cards and quizzes that are tailored to what the student considers important are automatically generated and available for subsequent use by the student.

Below, FIGS. 1A-1B, 2, 3, and 7 provide a description of exemplary devices. FIGS. 4A-4B and 5A-5O illustrate exemplary user interfaces for generating supplemental content. FIGS. 6A-6C are flow diagrams illustrating a method of generating supplemental content. The user interfaces in FIGS. 5A-5O are used to illustrate the processes in FIGS. 6A-6C.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
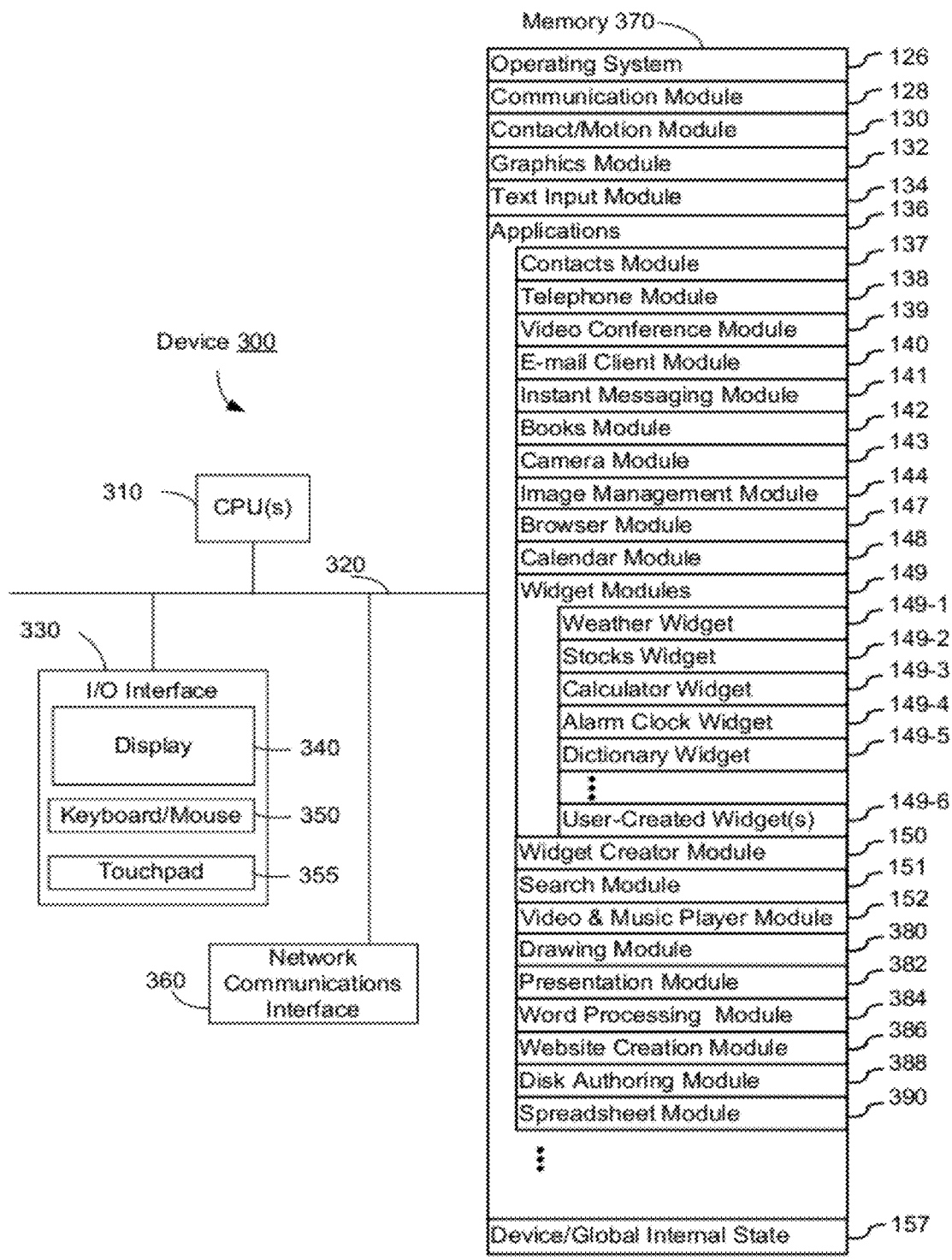
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
books module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, generate supplemental content, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
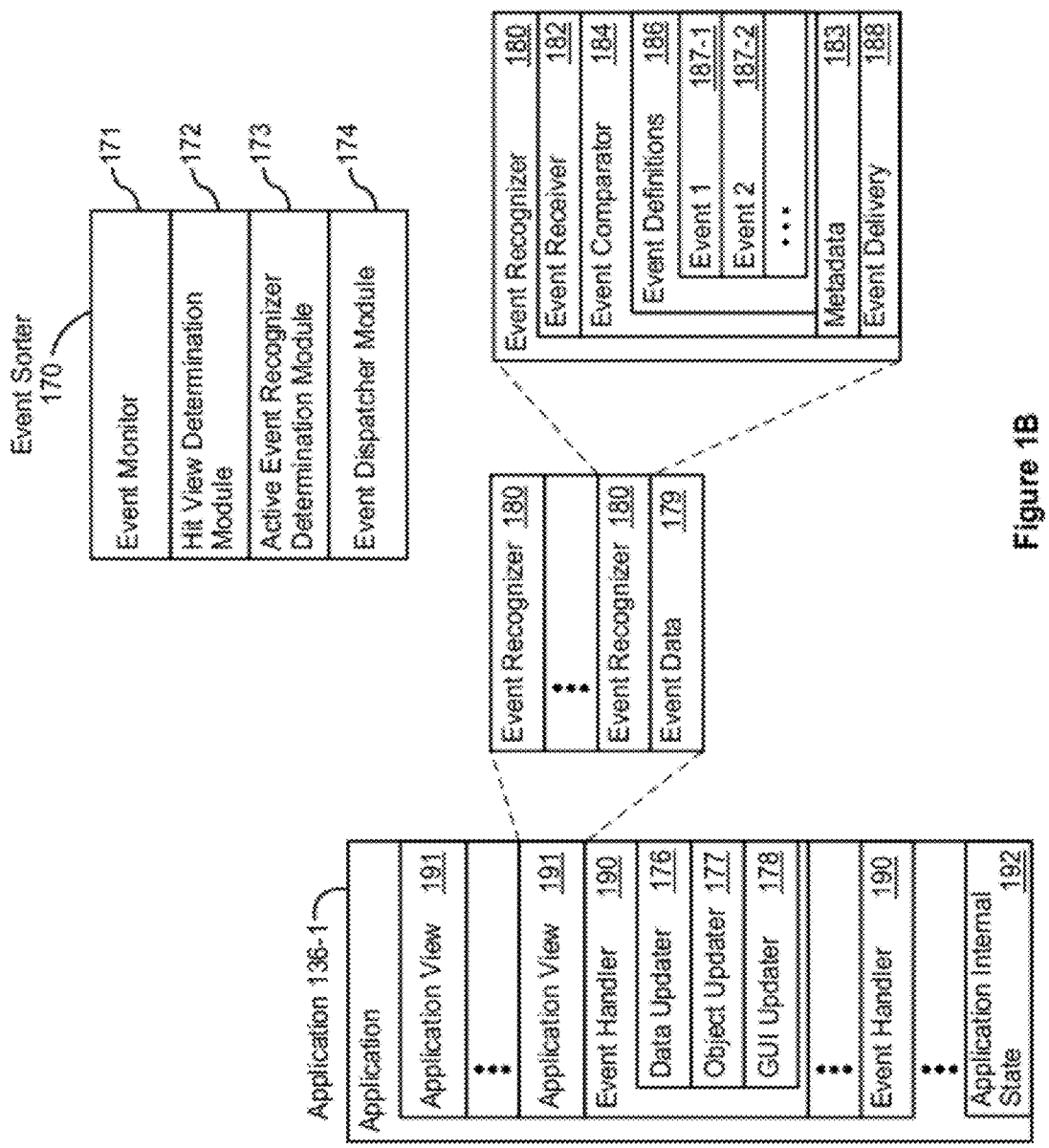
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
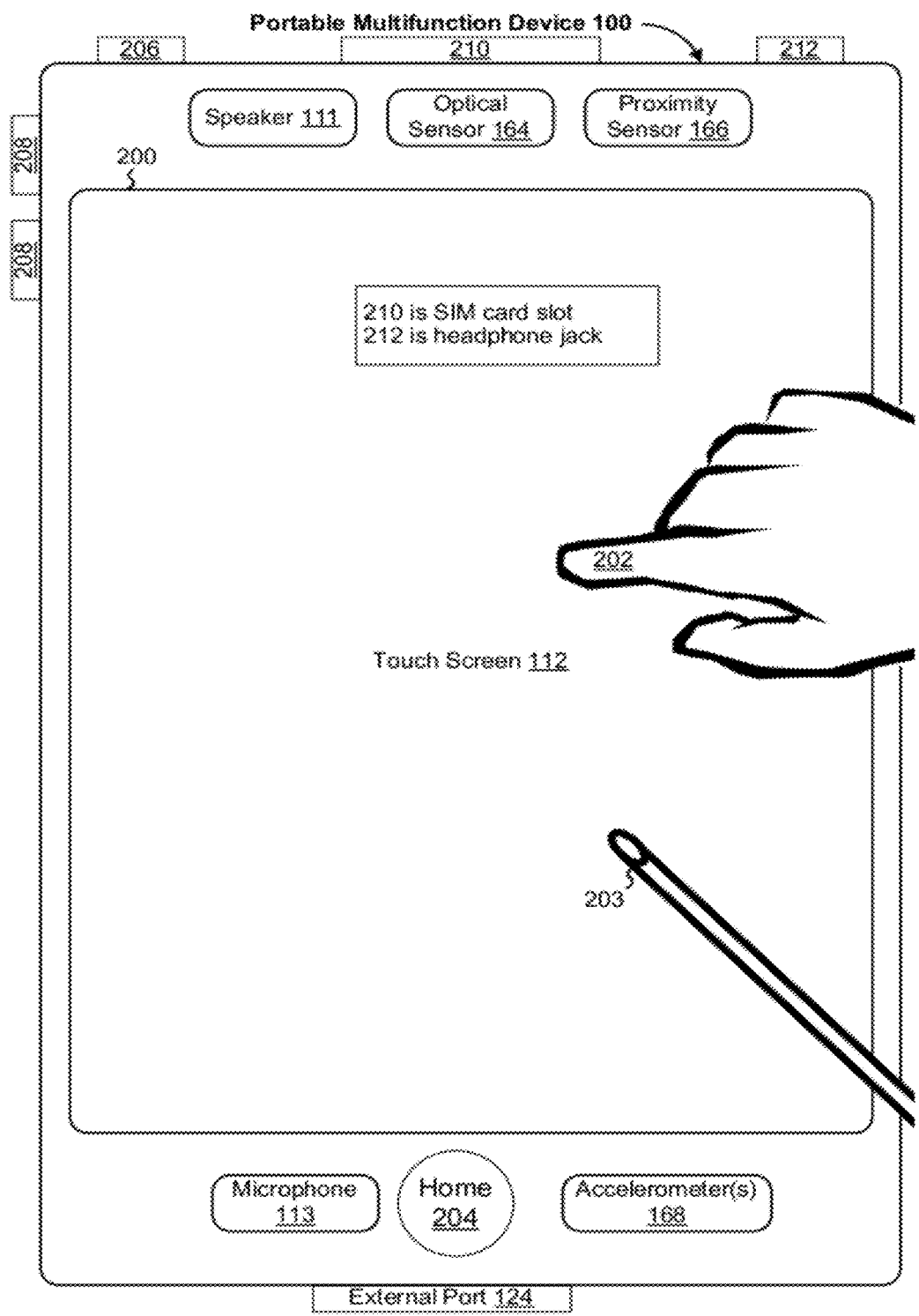
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
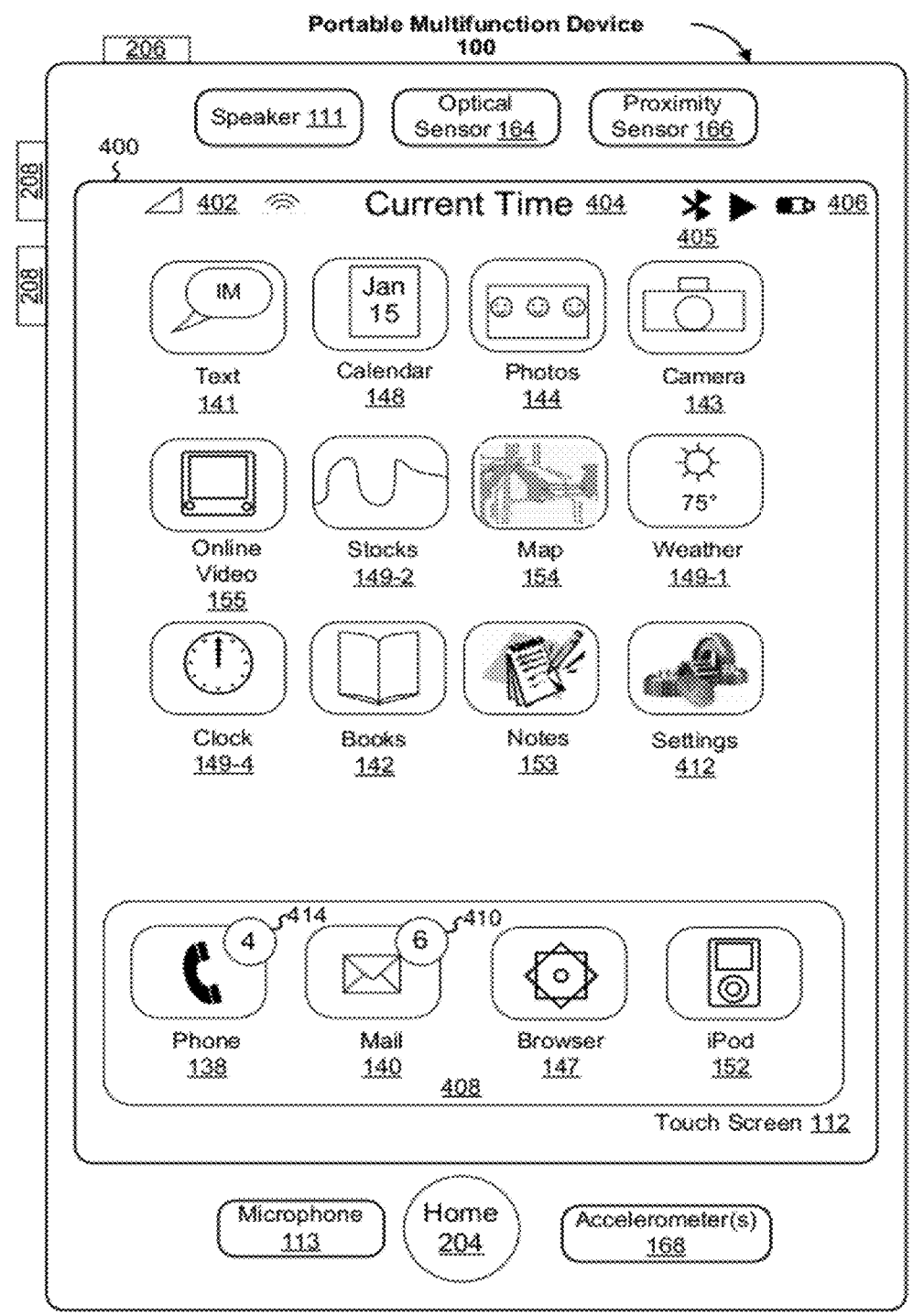
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Video and music player 152, also referred to as iPod (trademark of Apple Inc.) module 152; and Icons for other applications, such as:
- IM 141;
- Image management 144;
- Camera 143;
- Weather 149-1;
- Stocks 149-2;
- Books 142;
- Calendar 148;
- Alarm clock 149-4;
- Map 154;
- Notes 153;
    - Settings 412, which provides access to settings for device 100 and its various applications 136; and
    - Online video module 155, also referred to as YouTube (trademark of Google Inc.) module 155.

Figure 4B:
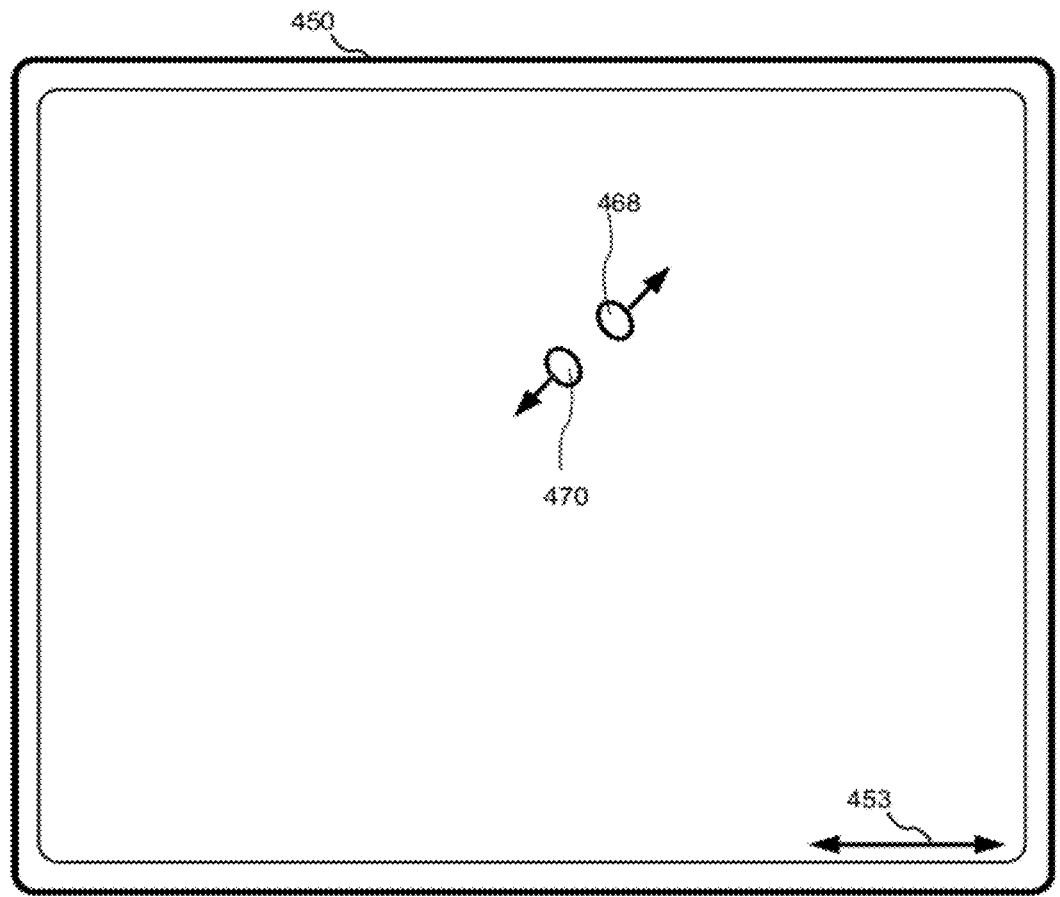
FIG. 4B illustrates an exemplary user interface for a multifunction device with a touch-sensitive surface that is separate from the display in accordance with some embodiments.
Figure 4B:
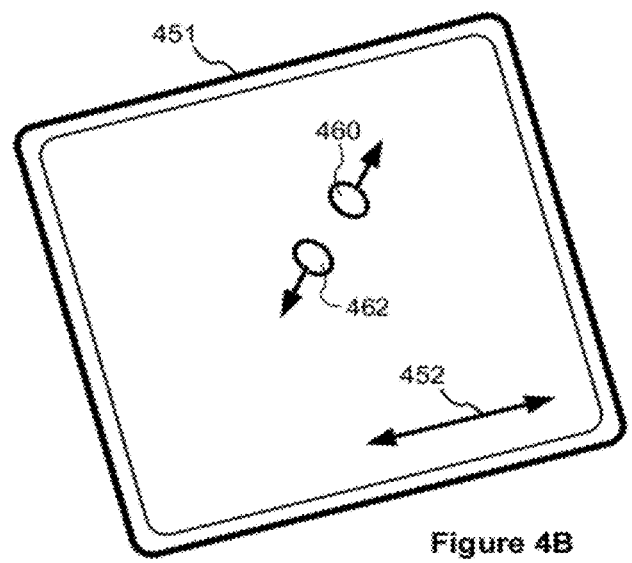

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5O illustrate exemplary user interfaces for generating supplemental content in accordance with some embodiments. The user interfaces in these figures are used to illustrate the processes described below, including the processes in FIGS. 6A-6C.

FIG. 5A illustrates user interface (UI) 500-A. UI 500-A includes document portion 504 (e.g., a page) of a document displayed in a primary user interface for the document on touch-sensitive display 112 of device 100. In some embodiments, the display layout of document portion 504 is defined by an author and/or publisher of the document.

Document portion 504 may include text and/or graphics (e.g., images, charts, etc.). Document portion 504 includes one or more author-specified terms (e.g., a word, a phrase, etc.) 506. In some embodiments, author-specified terms 506 are terms that the author and/or the publisher of the document consider to be important for understanding the subject matter conveyed by the document. In some embodiments, author-specified terms 506 are visually distinguished from other terms within document portion 504. For example, author-specified terms "brain" 506-1, "spinal cord" 506-2, "skull" 506-3, "vertebrae" 506-4, and "neuron" 506-n are displayed in boldface, distinguishing them from the rest of the text in document portion 504.

In some embodiments, an icon or button for accessing a supplemental user interface for the document is displayed. For example, UI 500-A includes a "Notes" icon 508. In response to activation of "Notes" icon 508 (e.g., by a tap gesture on the icon by a user), virtual note card 526 (FIG. 5F) may be displayed on touch-sensitive display 112. Additional content or information corresponding to one or more author-specified terms 506 may be displayed in a supplemental user interface (e.g., a virtual note card or a virtual quiz card). Further details regarding supplemental user interfaces for the document are described below.

Figure 5B:
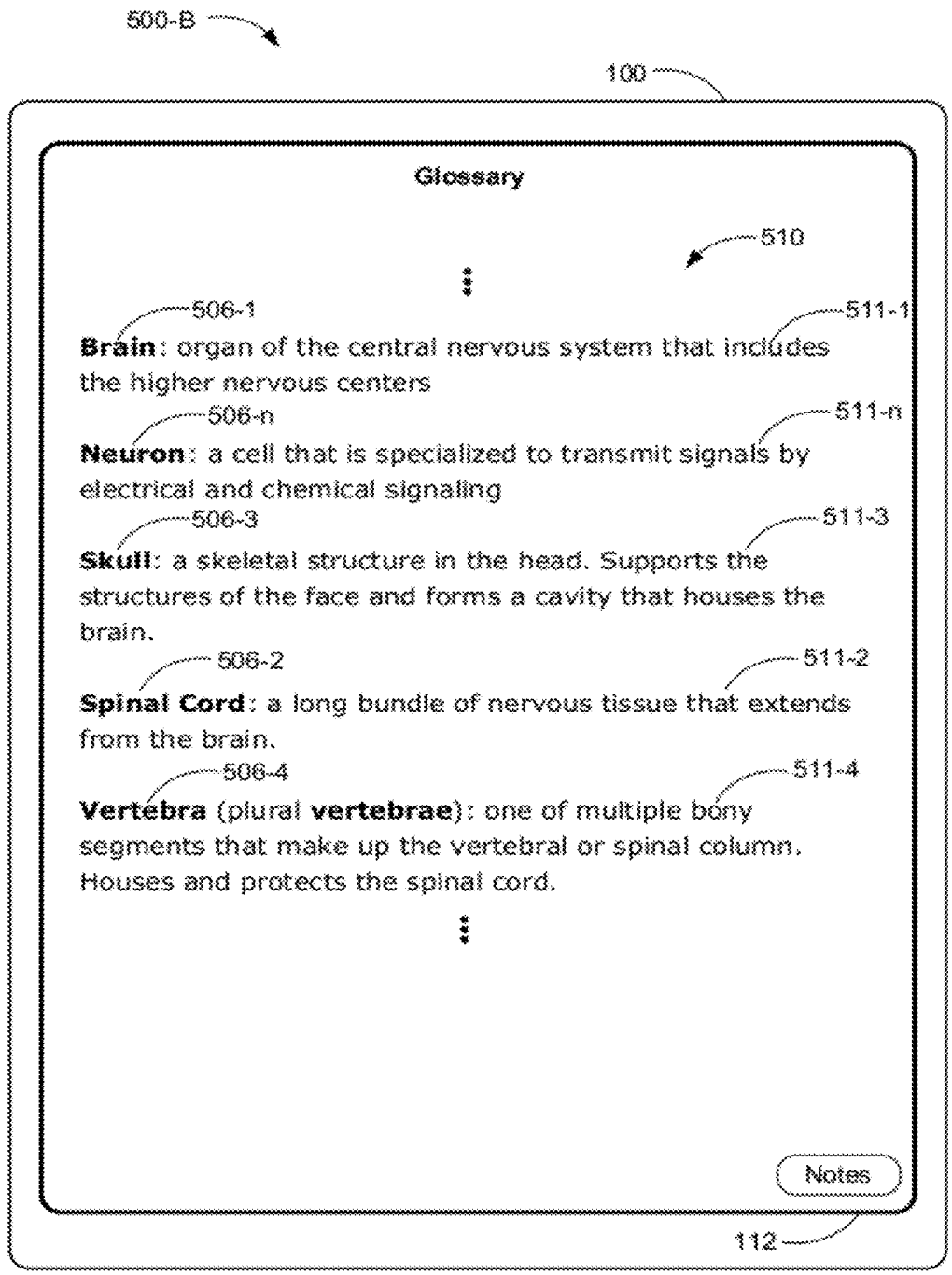
FIGS. 5A-5O illustrate exemplary user interfaces for generating supplemental content in accordance with some embodiments.
Figure 6A:
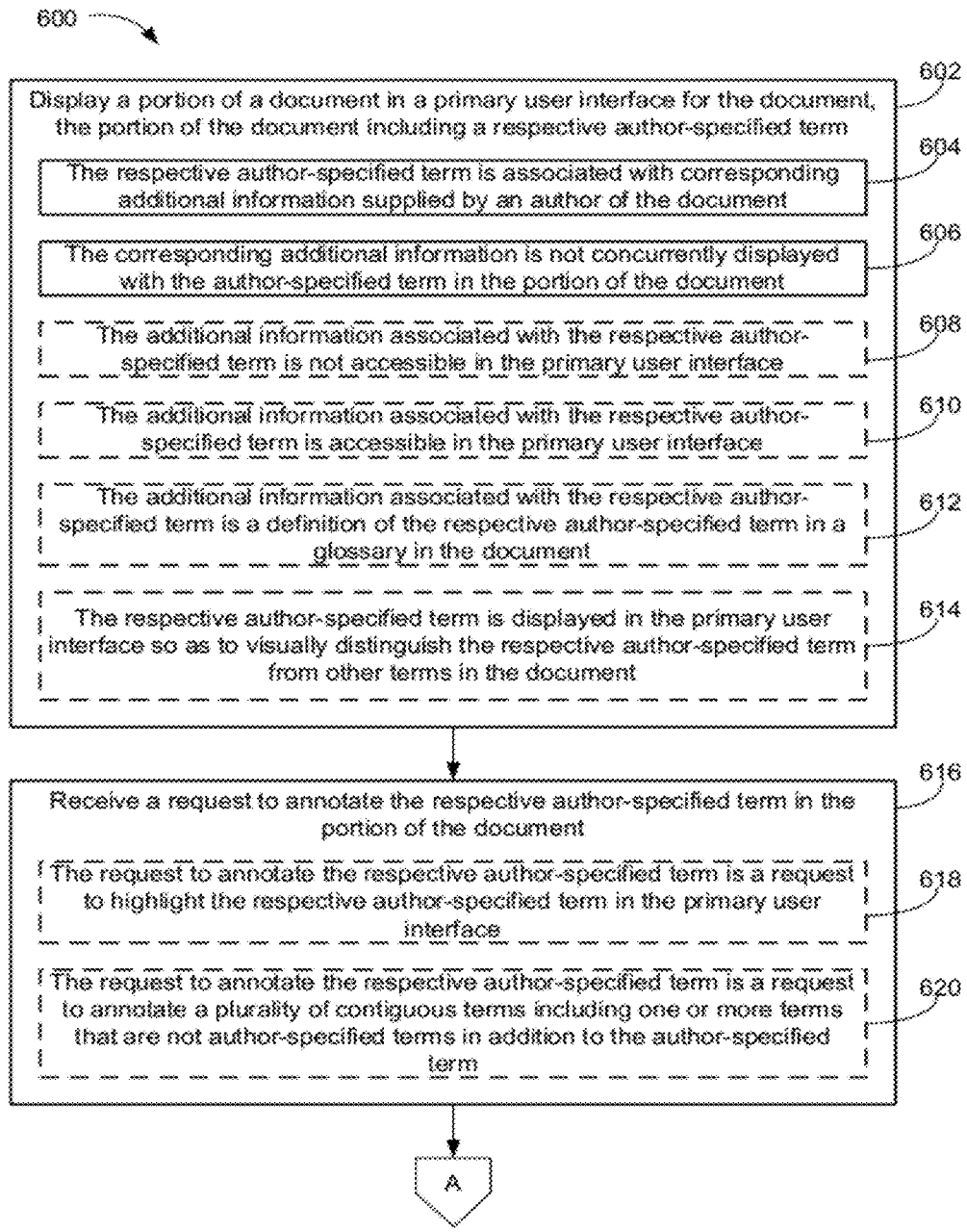
FIGS. 6A-6C are flow diagrams illustrating a method of generating supplemental content in accordance with some embodiments.
Figure 6B:
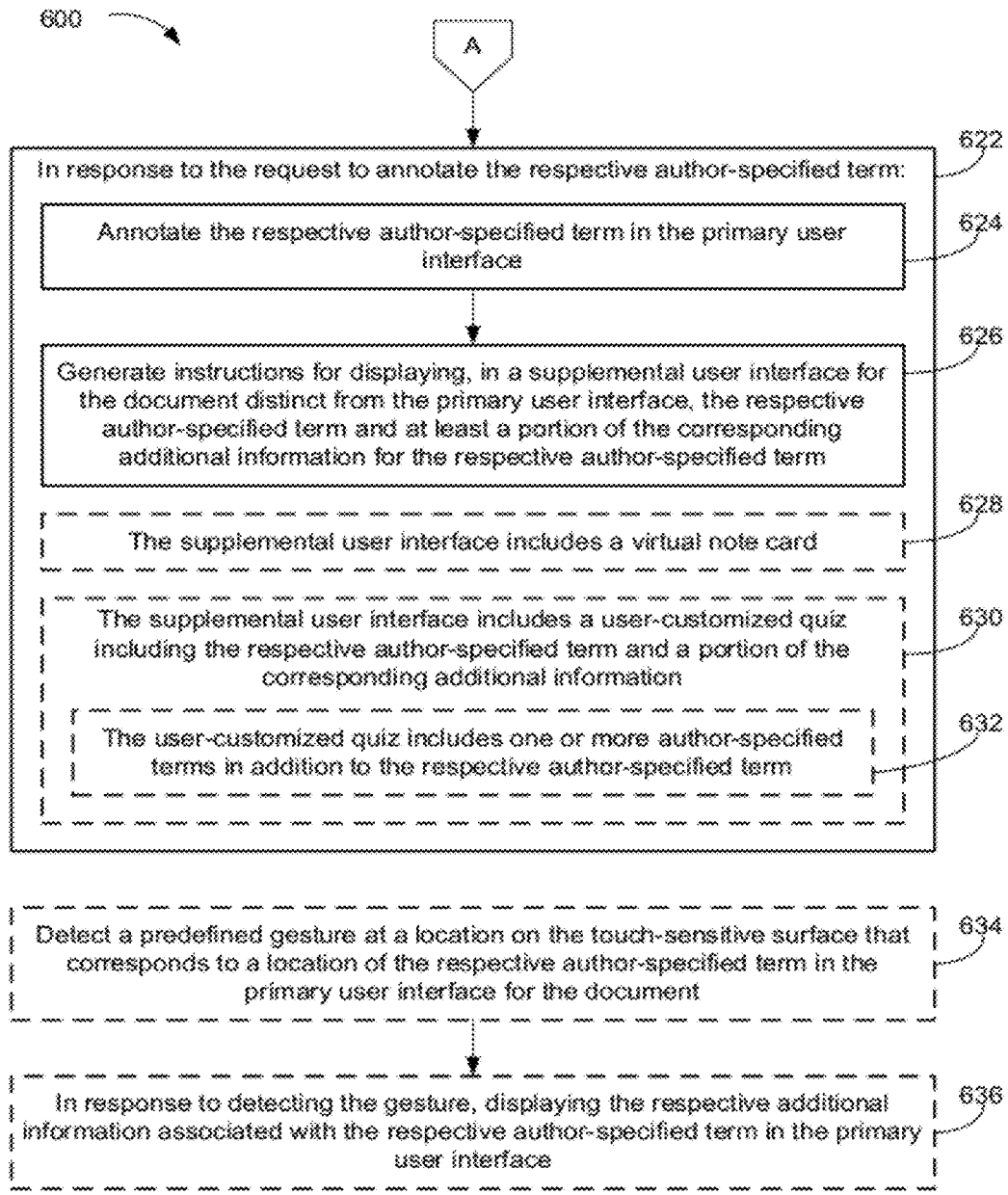
Figure 6C:
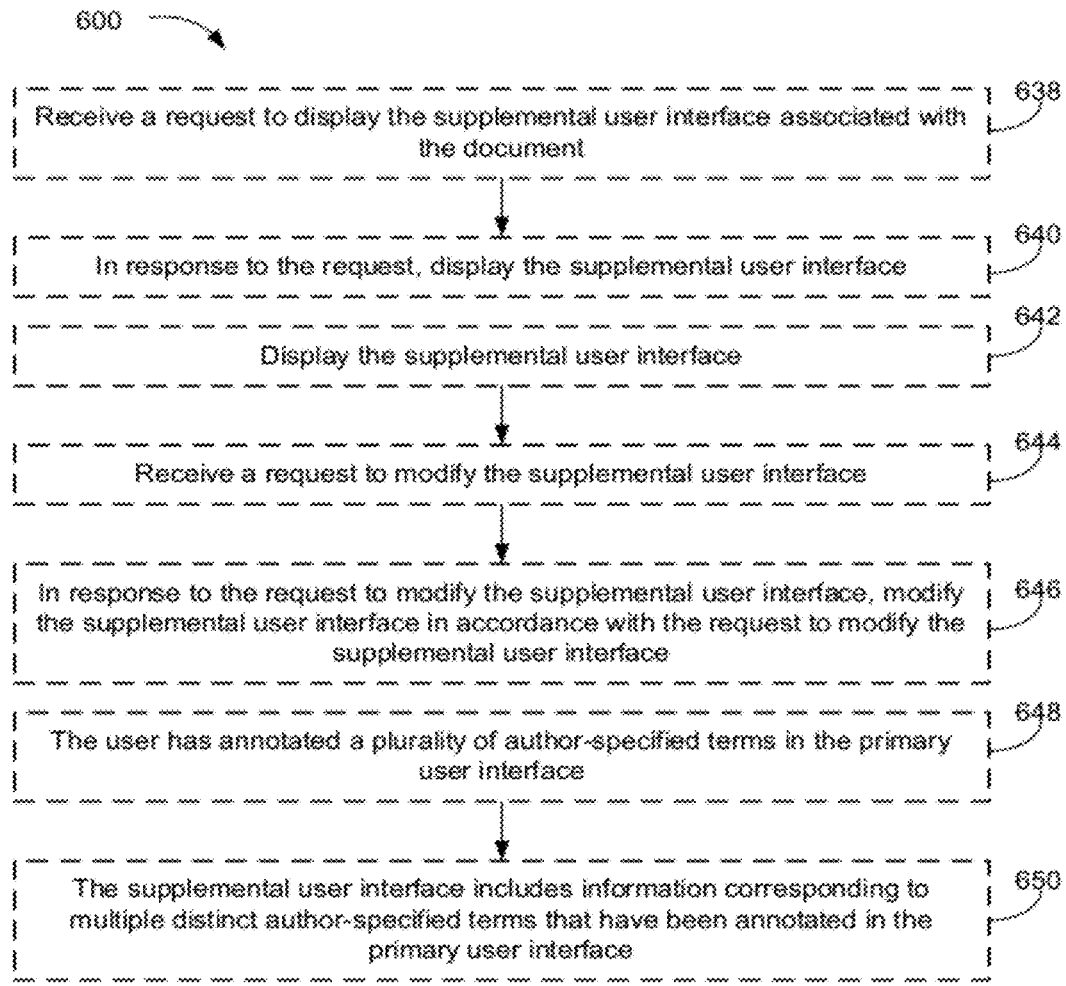

FIG. 5B illustrates UI 500-B. UI 500-B includes additional content 510, distinct from document portion 504, displayed on touch-sensitive display 112. Additional content 510 is typically supplied by the same author(s) as document portion 504. In some embodiments, additional content 510 is a part of the same document as document portion 504. For example, additional content 510 may be found at or near the end of the document, after the main content. In some other embodiments, additional content 510 is metadata for the document that includes document portion 504 and a user reading the document would normally be unable to navigate to additional content 510.

Additional content 510 includes content or information corresponding to author-specified terms 506. In some embodiments, additional content 510 includes a glossary with definition information 511 for author-specified terms 506. For example, in FIG. 5B, additional content 510 includes author-specified terms 506-1 thru 506-n and their corresponding definitions 511-1 through 511-n.

FIG. 5C illustrates UI 500-C. UI 500-C includes finger gesture 512, moving in direction 514, detected on touch-sensitive display 112 while document portion 504 is displayed in the primary user interface for the document. Gesture 512 moves over text "The spinal cord carries nerve impulses," which includes author-specified term "spinal cord" 506-2. In response to detection of gesture 512, the text "The spinal cord carries nerve impulses" is annotated (e.g., with highlighting), as shown in FIG. 5D. In some embodiments, gesture 512 is a swipe gesture or a drag gesture.

FIG. 5D illustrates UI 500-D. UI 500-D includes highlighting 516 on the text "The spinal cord carries nerve impulses," which includes author-specified term "spinal cord" 506-2, in document portion 504. Highlighting 516 on text "The spinal cord carries nerve impulses" is displayed in response to detection of gesture 512 over the same text (FIG. 5C). When the text "The spinal cord carries nerve impulses" is highlighted, instructions for displaying a supplemental user interface (e.g., a virtual note card or a virtual quiz card) that includes the term "spinal cord" 506-2 and its corresponding definition 511 from additional content 510, are generated. The supplemental user interface, which is distinct from the primary user interface in which document portion 504 is displayed, may be subsequently displayed on touch-sensitive display 112 (e.g., in response to detecting a tap gesture 522 on the Notes icon 508, FIG. 5E).

UI 500-D also includes gesture 518 being detected on touch-sensitive display 112. In some embodiments, gesture 518 is a tap gesture. In some other embodiments, gesture 518 is a tap and hold gesture. Gesture 518 is detected at a location on touch-sensitive display 112 that corresponds to the term "spinal cord" 506-2 that is highlighted by highlighting 516. In response to detection of gesture 518, pop-up 520 is displayed, as shown in FIG. 5E.

It should be appreciated that while "spinal cord" 506-2 is shown as being highlighted along with one or more contiguous terms that are not author-specified terms 506, highlighting (or more generally, annotating) terms that are not author-specified terms 506 are optional in the embodiments described above and below. For example, pop-up 520 is displayed in response to detection of gesture 518 even if highlighting 516 just highlights the term "spinal cord" 506-2.

Figure 5E:
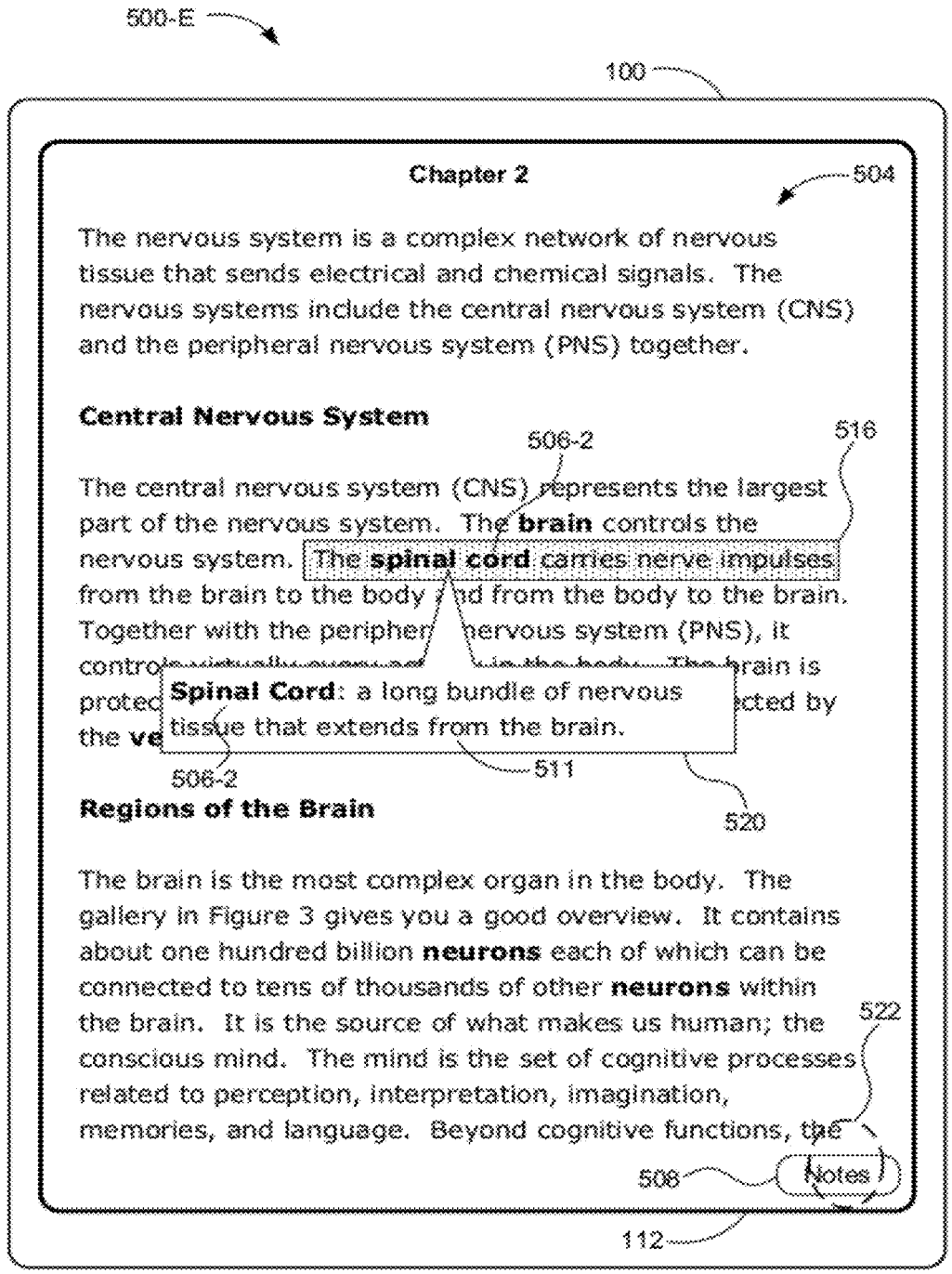

FIG. 5E illustrates UI 500-E. UI 500-E includes pop-up 520, which is displayed in response to detection of gesture 518 (FIG. 5D). Pop-up 520 includes author-specified term "spinal cord" 506-2 and its corresponding definition 511-2 drawn from additional content 510. Pop-up 520 is displayed concurrently with document portion 504, as shown in FIG. 5E.

UI 500-E also includes gesture 522 detected on "Notes" icon 508. In some embodiments, gesture 522 is a tap gesture. In response to detection of gesture 522 on "Notes" icon 508, virtual note card 526 is displayed, as shown in FIG. 5F.

Figure 5F:
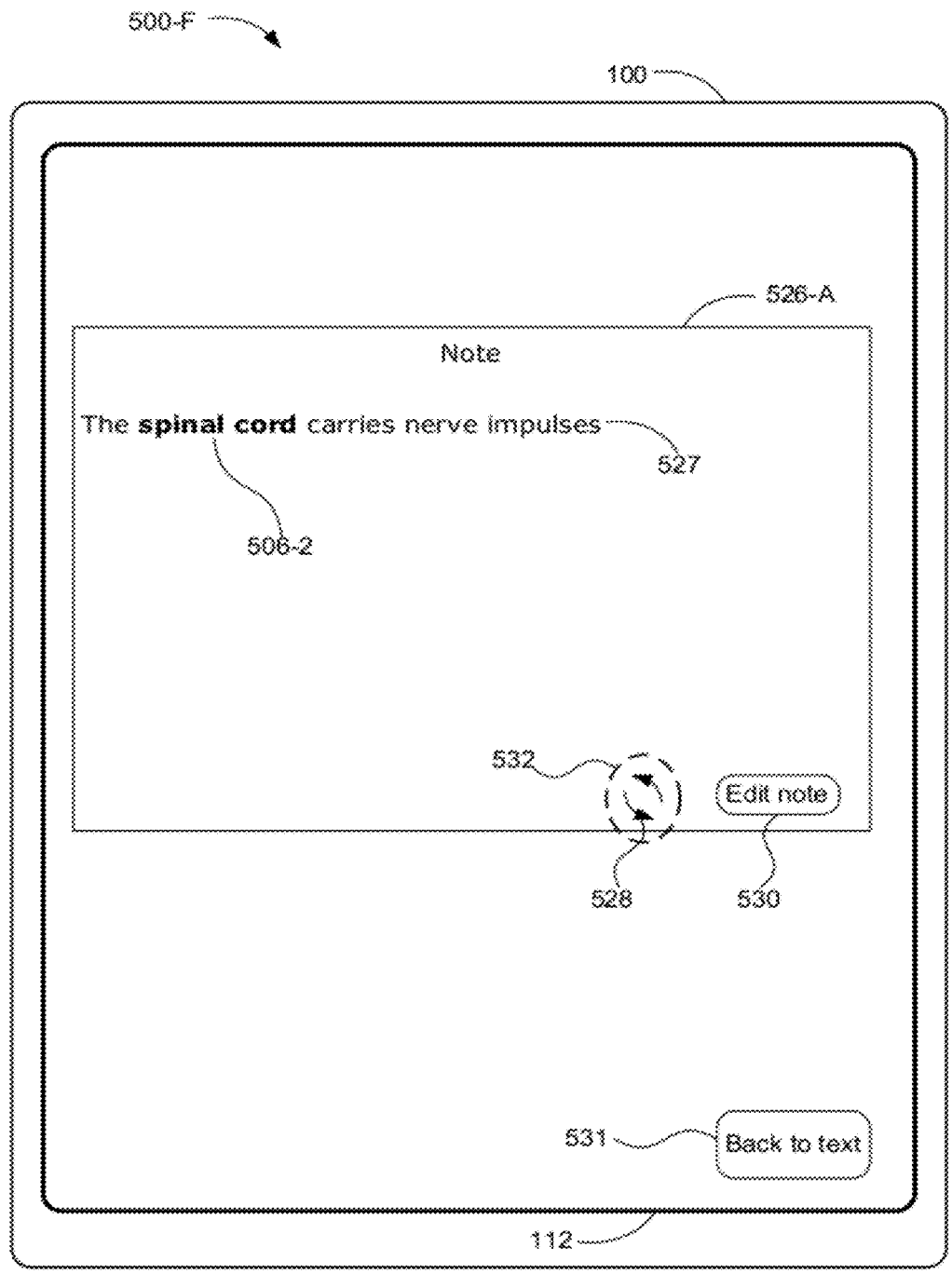
Figure 5G:
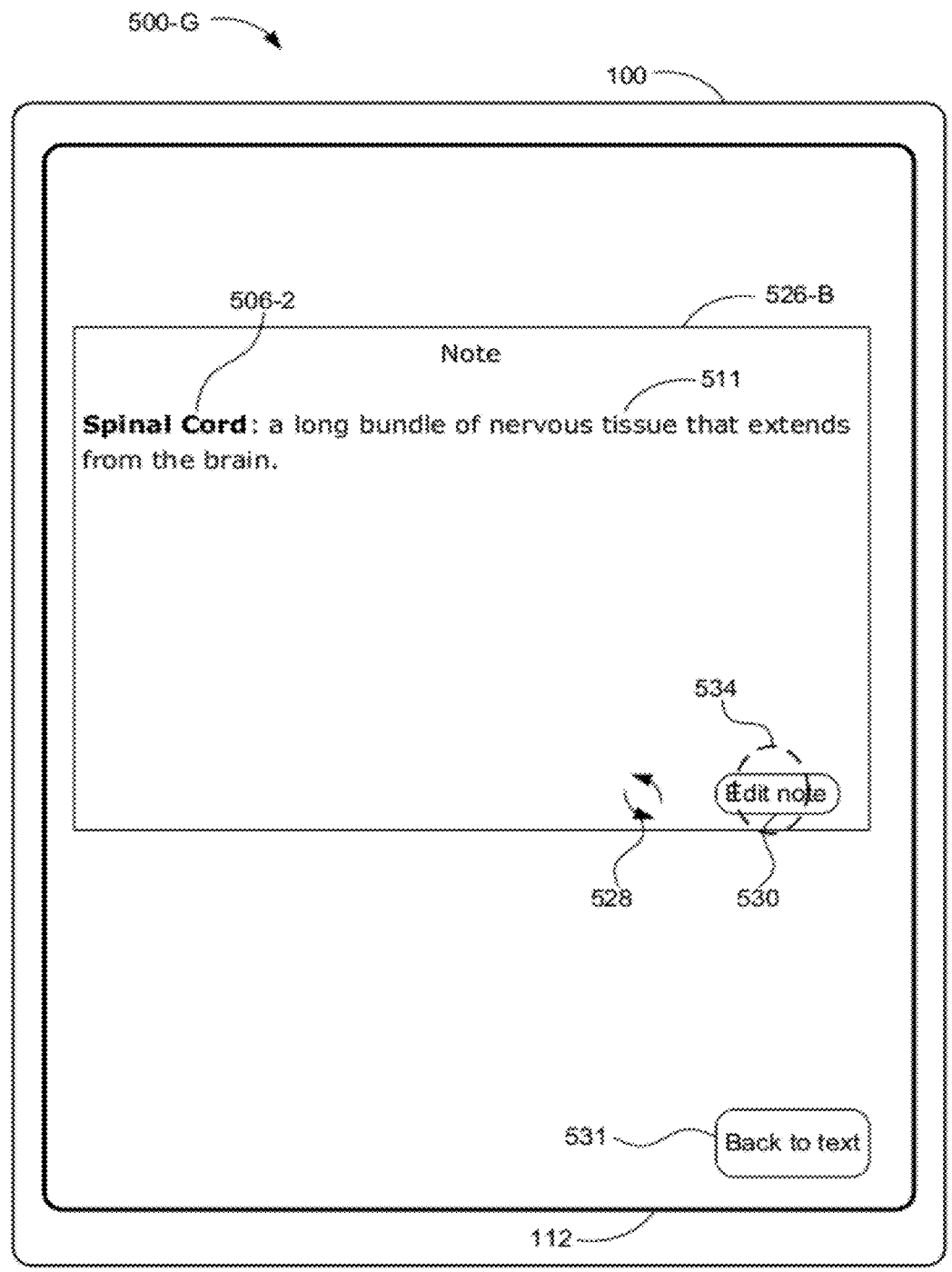

FIG. 5F illustrates UI 500-F. UI 500-F is a supplemental user interface that includes virtual note card 526 displayed on touch-sensitive display 112. In some embodiments, virtual note card 526 is displayed separately from document portion 504, as shown in FIG. 5F. In some embodiments, virtual note card 526 includes "front" side 526-A (FIG. 5F) and "back" side 526-B (FIG. 5G). In some embodiments, flip icon 528 and "Edit note" icon 530 are displayed with virtual note card 526. In response to detection of gesture 532 (e.g., a tap gesture) on flip icon 528, "back" side 526-B is displayed (FIG. 5G), replacing display of "front" side 526-A (FIG. 5F).

In some embodiments, "Back to text" icon 531 is also displayed. When a gesture (e.g., a tap gesture) is detected on "Back to text" icon 531, the primary user interface with the document portion (e.g., document portion 504) whose display was replaced by the supplemental user interface with virtual note card 526 is re-displayed, replacing display of virtual note card 526. In some other embodiments, the supplemental user interface (e.g., virtual notecard 526) is overlaid on the primary user interface, and the primary user interface is faded, darkened or otherwise visually minimized (not shown).

Content that is displayed in virtual note card 526 (on "front" side 526-A, "back" side 526-B, or both sides) includes the term "spinal cord" 506-2 that is highlighted by highlighting 516 (FIG. 5E) and at least a portion of content, drawn from additional content 510, that is related to term "spinal cord" 506-2 (e.g., corresponding definition 511-2). In some embodiments, virtual note card 526 includes text highlighted by highlighting 516 that is contiguous with the highlighted term "spinal cord" 506-2 in document portion 504. For example, in FIG. 5F, "front" side 526-A of virtual note card 526 is displayed. "Front" side 526-A includes text 527, which repeats the highlighted text "The spinal cord carries nerve impulses" that is highlighted by highlighting 516 in document portion 504 (FIG. 5E). Text 527 includes the author-specified term "spinal cord" 506-2.

FIG. 5G illustrates UI 500-G. UI 500-G includes "back" side 526-B of virtual note card 526 displayed on touch-sensitive display 112. "Back" side 526-B includes author-specified term "spinal cord" 506-2 and its corresponding definition 511-2.

UI 500-G also includes gesture 534 (e.g., a tap gesture) detected on "Edit note" icon 530. In response to detection of gesture 534 on "Edit note" icon 530, virtual note card 526 is displayed in edit mode 526-C, as shown in FIG. 5H.

Figure 5H:
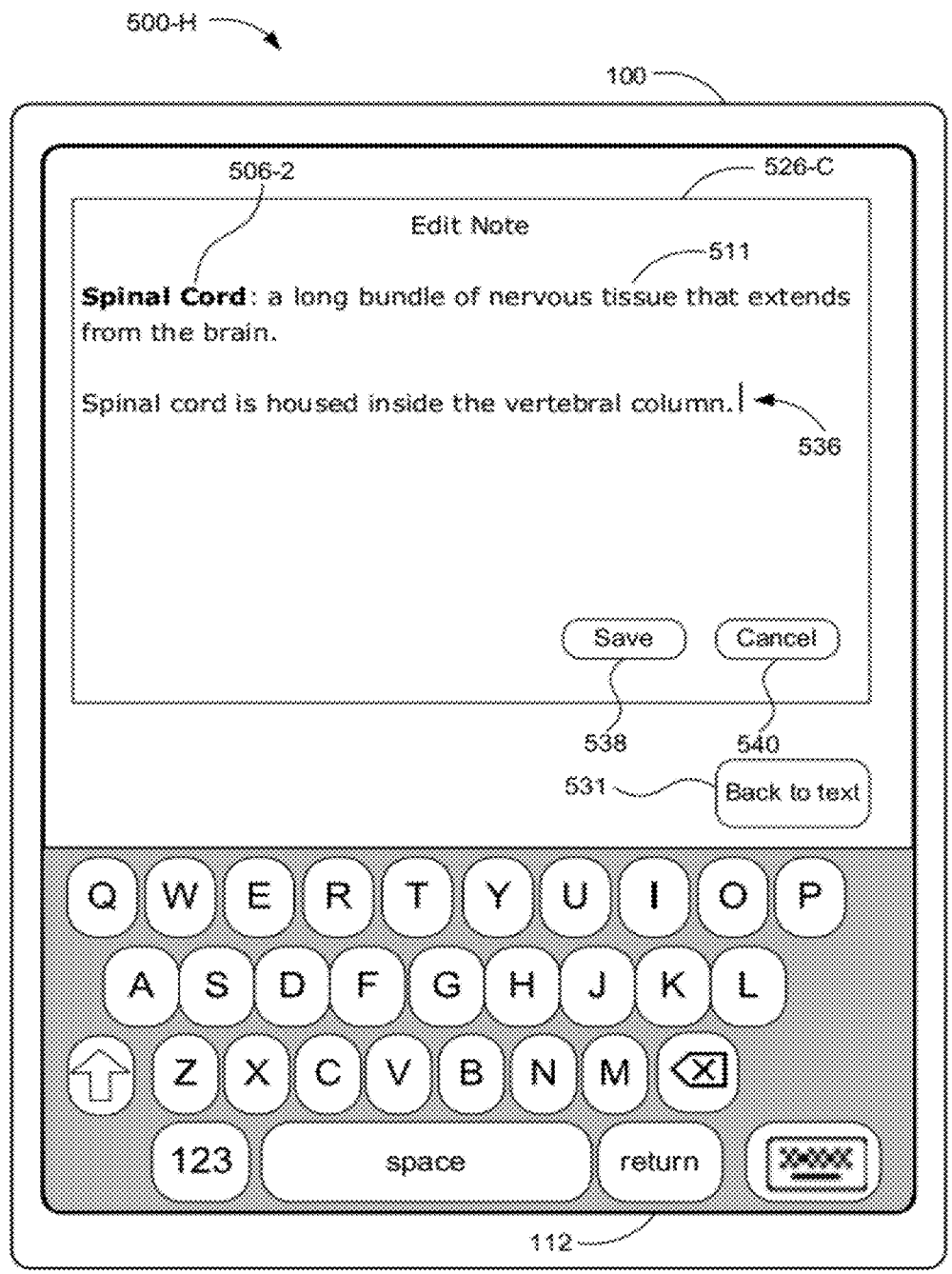

FIG. 5H illustrates UI 500-H. UI 500-H includes virtual note card 526 displayed in edit mode 526-C on touch-sensitive display 112. While in edit mode 526-C, the user may add to, edit, or remove from the text displayed in virtual note card 526 via gestures on the note card, keyboard, and icons in UI 500-H. For example, FIG. 5H shows user-entered text 536, "Save" icon 538, and "Cancel" icon 540 displayed in virtual note card 526 while in edit mode 526-C. When a gesture (e.g., a tap gesture) is detected on "Save" icon 538, user-entered text 536, as well as any other changes to the text in virtual note card 526, are saved and become part of the text. When a gesture (e.g., a tap gesture) is detected on "Cancel" icon 540, user-entered text 536, as well as any other changes to the text in virtual note card 526, are not saved and the text in virtual note card 526 is not changed.

In some embodiments, when a gesture is detected on "Edit note" icon 530 while "front" side 526-A is displayed, the user may edit just the text displayed in "front" side 526-A until the edits are saved or canceled. Similarly, when a gesture is detected on "Edit note" icon 530 while "back" side 526-B is displayed, the user may edit just the text displayed in "back" side 526-B until the edits are saved or canceled. In other embodiments, the virtual notecard 526 can be flipped over while in edit mode so that either side of the card may be edited (not shown).

Virtual note card 526 is an example of a supplemental user interface where additional content or information related to author-specified terms 506 that have been annotated (e.g., highlighted) by the user may be displayed. Another example of a supplemental user interface is a virtual quiz card, which is described further below.

Figure 5J:
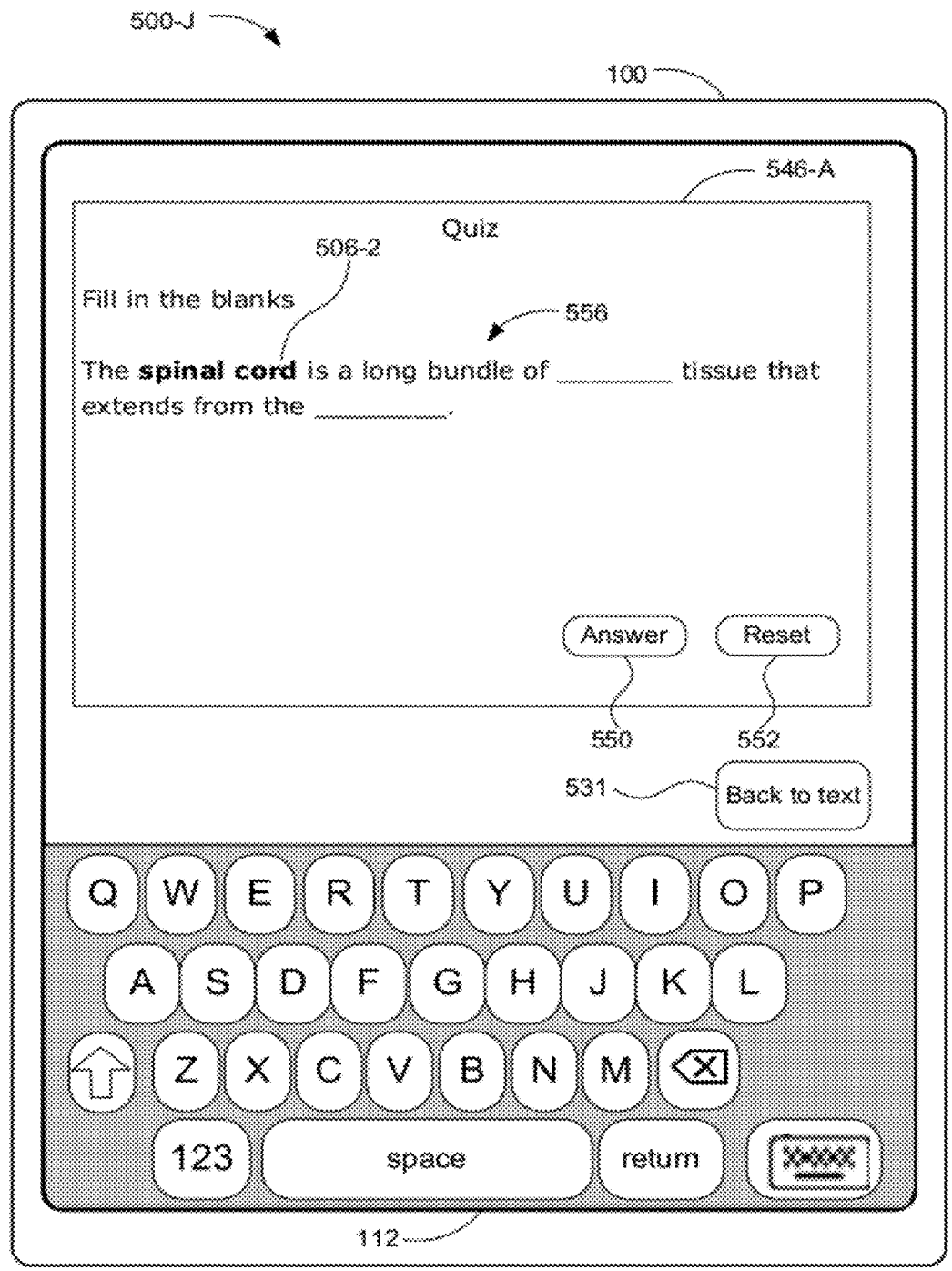

FIG. 5I illustrates UI 500-I. UI 500-I is similar to UI 500-D, with the difference being that the "Notes" icon 508 is replaced by the "Quiz" icon 542. UI 500-I also includes gesture 544 (e.g., a tap gesture) detected on "Quiz" icon 542. In response to detection of gesture 544 on "Quiz" icon 542, virtual quiz card 546 is displayed, as shown in FIG. 5J. In some embodiments, the primary user interface includes elements (e.g., a "Notes" icon and a "Quiz" icon) that when activated (e.g., via tap gestures) allow either note cards or a quiz to be displayed.

FIG. 5J illustrates UI 500-J, which includes virtual quiz card 546 and "Back to text" icon 531 being displayed on touch-sensitive display 112. In some embodiments, virtual quiz card 546 includes question side 546-A and answer side 546-B. A question related to an annotated author-specified term 506 is displayed in question side 546-A, and an answer to the question is displayed in answer side 546-B. For example, in FIG. 5J, fill-in-the-blank question 556 is displayed in question side 546-A. Fill-in-the-blank question 556 includes the term "spinal cord" 506-2 that is highlighted in document portion 504 and text drawn from definition 511-2 corresponding to term "spinal cord" 506-2; fill-in-the-blank question 556 is generated from term "spinal cord" 506-2 and its corresponding definition 511-2. Question 556 includes one or more blanks that the user may fill in. For example, a user may perform a tap gesture on a blank in question 556 to bring up a virtual keyboard and type in an answer for the blanks.

Also displayed in question side 546-A of virtual quiz card 546 are "Answer" icon 550 and "Reset" icon 552. When a gesture (e.g., a tap gesture) is detected on "Reset" icon 552, in response to the detection, any answers that have been entered by the user to a currently displayed question 556 are cleared, giving the user an opportunity to re-enter the answers. When a gesture (e.g., a tap gesture) is detected on "Answer" icon 550, answer side 546-B of virtual quiz card 546 is displayed, as shown in FIG. 5K.

Figure 5K:
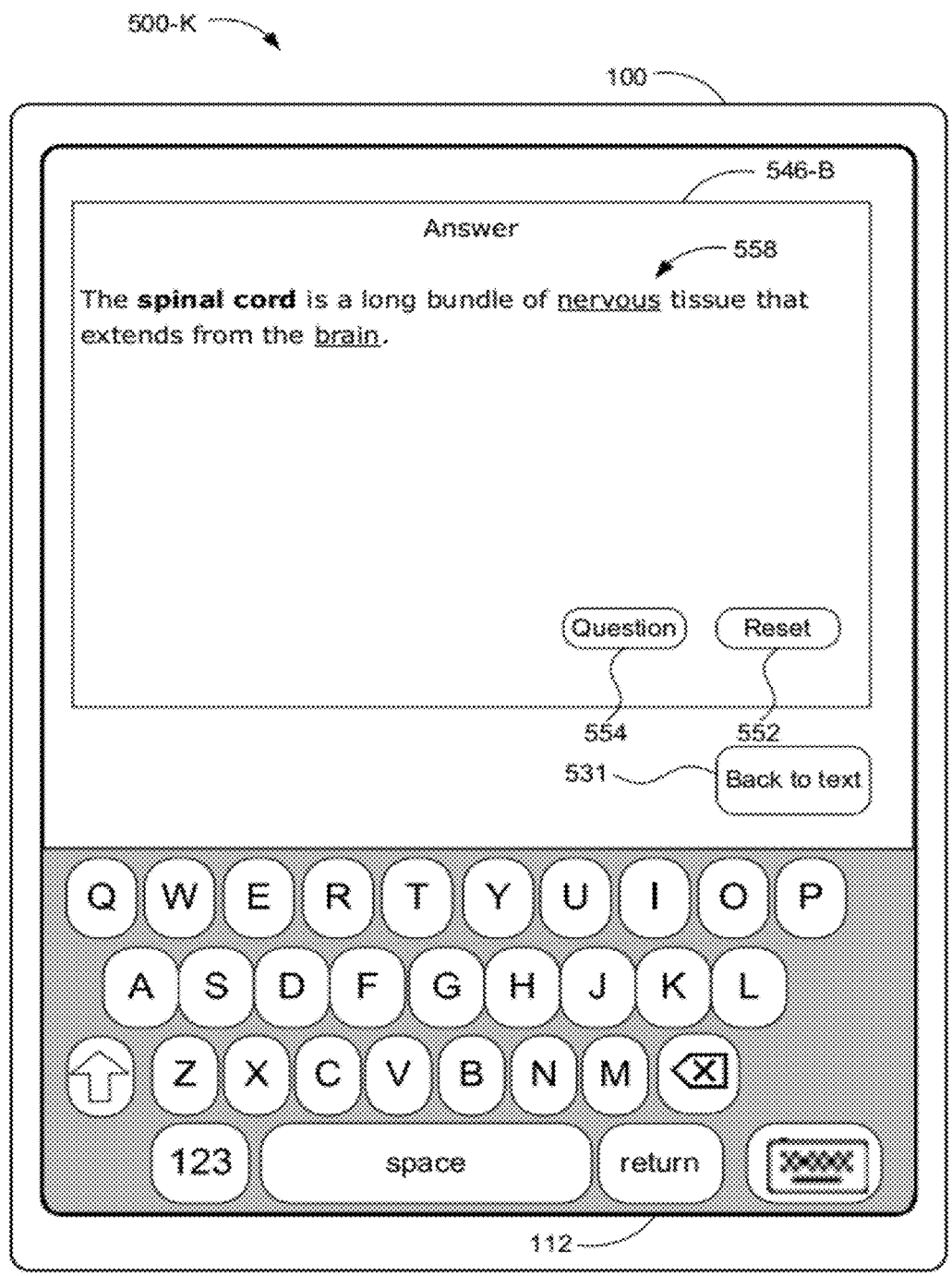

FIG. 5K illustrates UI 500-K, which includes answer side 546-B of virtual quiz card 546 and "Back to text" icon 531 being displayed on touch-sensitive display 112. Answer side 546-B includes correct answer 558 to the corresponding question that is displayed in question side 546-A (e.g., fill-in-the-blank question 556). In some embodiments, graphical marks may be displayed to indicate whether the user provided the correct or incorrect answer. For example, for correct answer 558 corresponding to fill-in-the-blank question 556, a mark indicating whether the user-provided answer is correct (e.g., a check mark) or not (e.g., an "X" mark) may be displayed for each respective blank (not shown).

Also displayed in answer side 546-B are "Question" icon 554 and "Reset" icon 552. When a gesture (e.g., a tap gesture) is detected on "Question" icon 554, virtual quiz card 546 flips back to display of question side 546-A, as in FIG. 5J.

Figure 5L:
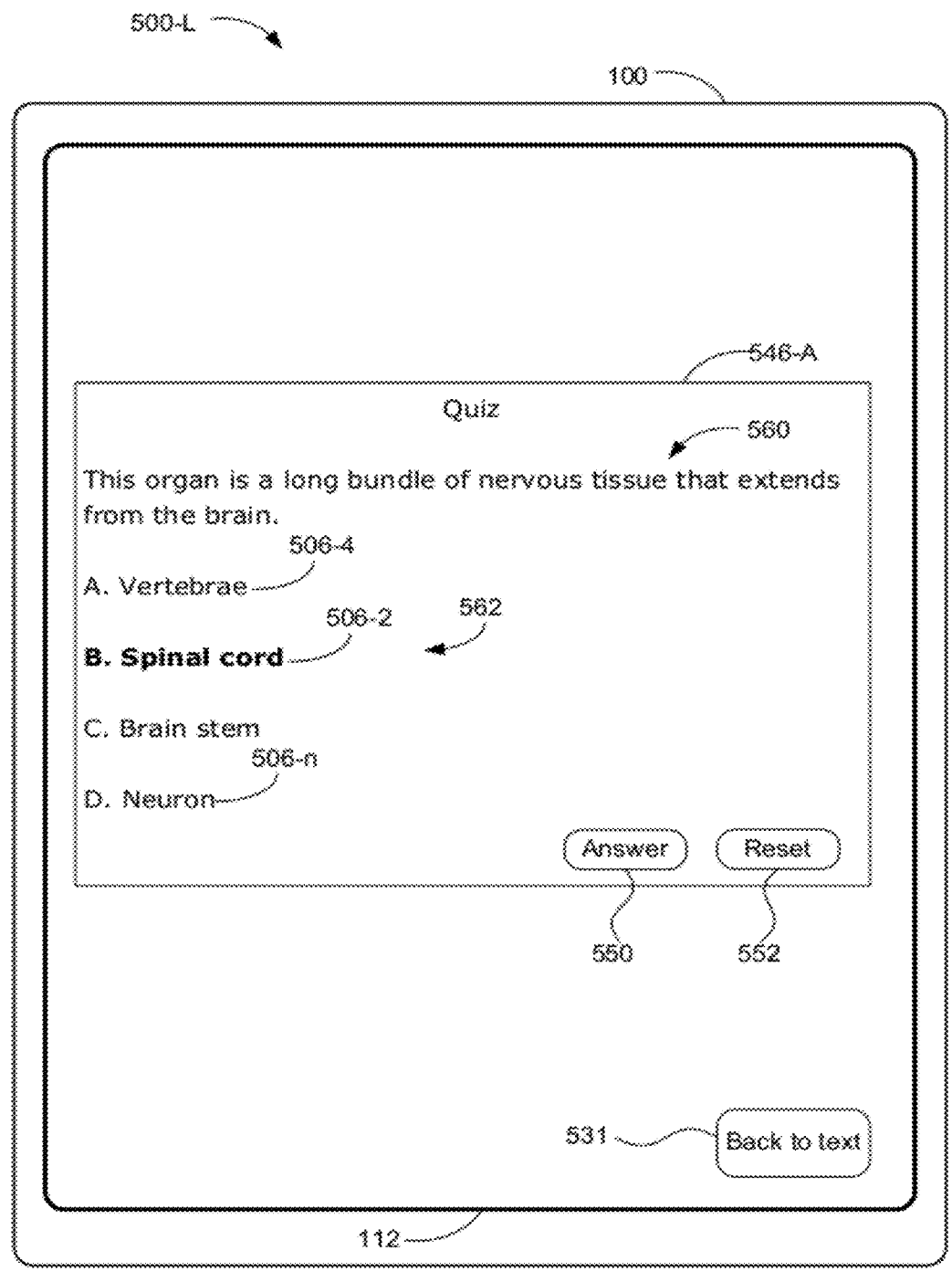

Fill-in-the-blank questions are merely one example of quiz questions that may be displayed in virtual quiz card 546. FIG. 5L illustrates UI 500-L. UI 500-L includes question side 546-A of virtual quiz card 546 with multiple-choice question 560 and corresponding answer choices 562. In some embodiments, multiple-choice question 560 is generated from portions (e.g., definitions 511) of additional content 510 corresponding to an annotated author-specified term 506, and answer choices 562 include the corresponding annotated author-specified term 506 as one of the choices. The user may select an answer choice by performing a gesture (e.g., a tap gesture) at a location on touch-sensitive display 112 corresponding to the answer choice. Further, in some embodiments, answer choices 562 includes multiple author-specified terms 506, including the author-specified term that is the correct answer for question 560.

For example, question 560 as shown in FIG. 5L is generated from definition 511-2 that corresponds to annotated author-specified term "spinal cord" 506-2. Answer choices 562 as shown in FIG. 5L include the annotated author-specified term "spinal cord" 506-2, as well as author-specified terms "vertebrae" 506-4 and "neuron" 506-n.

While FIGS. 5D and 5I show just one author-specified term 506 (namely "spinal cord" 506-2) highlighted by highlighting 516 on document portion 504, multiple author-specified terms 506 may be annotated (e.g., highlighted) at a time on a document portion, as shown in FIG. 5M described below.

Figure 5N:
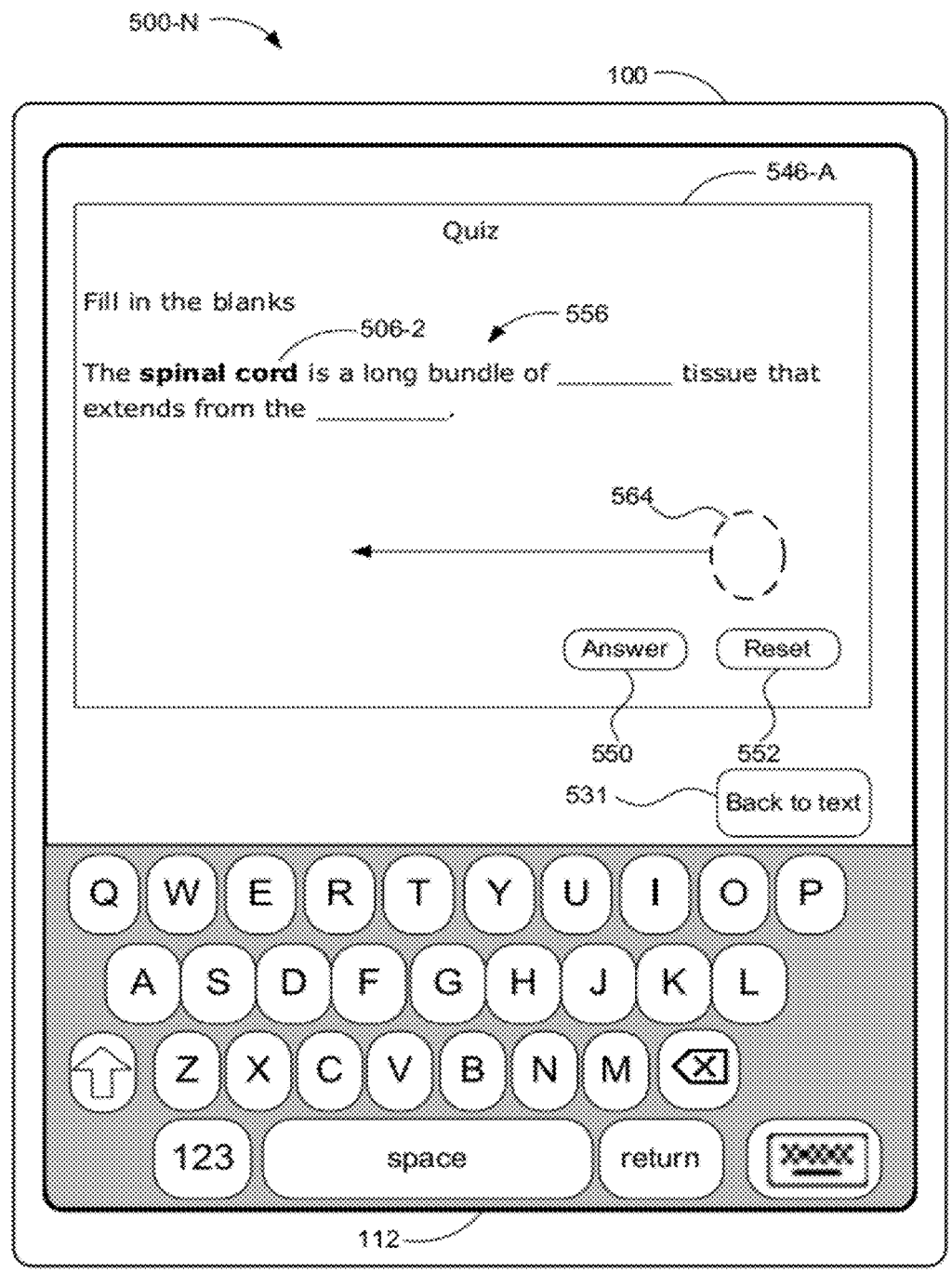
Figure 5O:
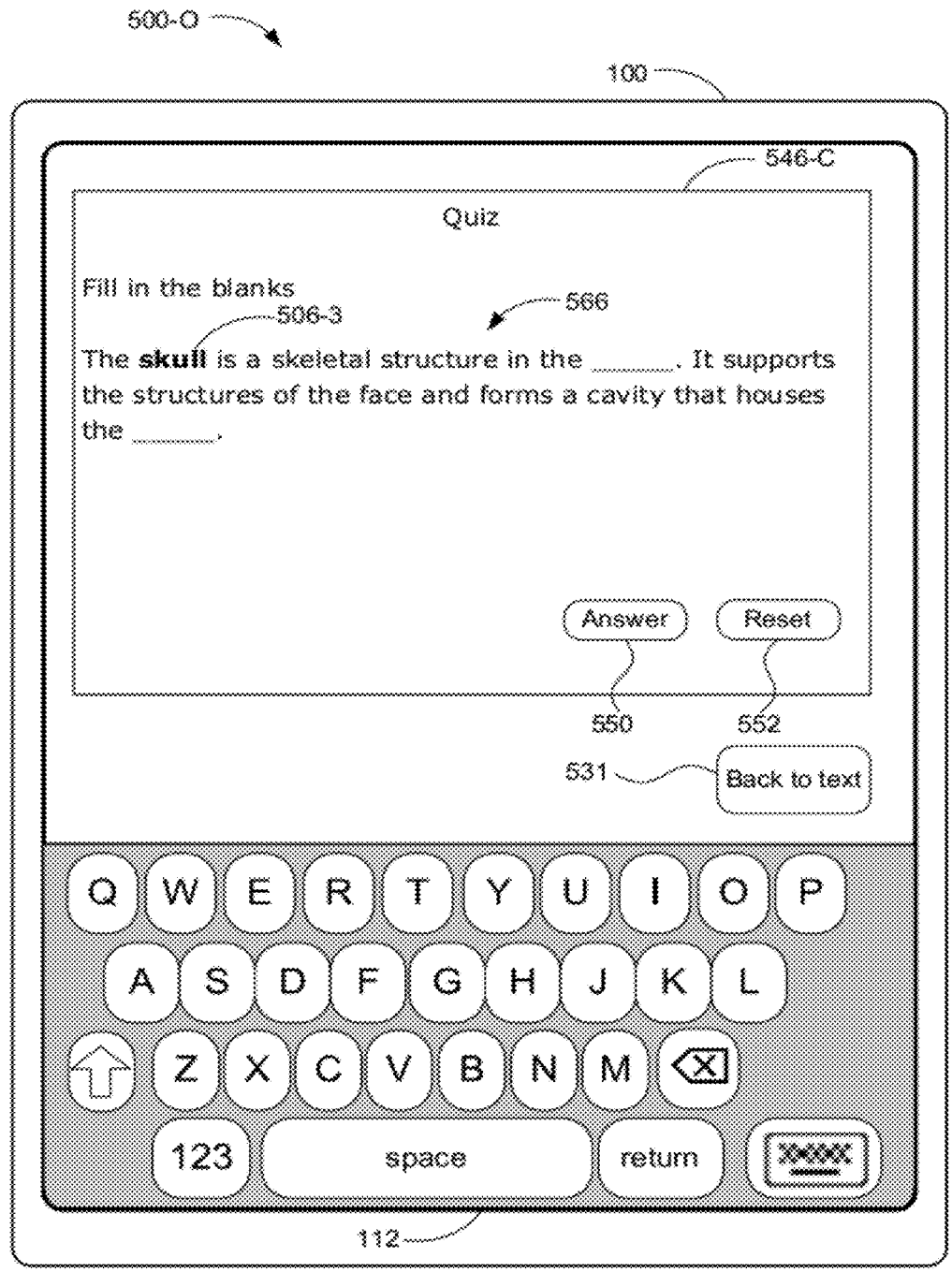

FIG. 5M illustrates UI 500-M. UI 500-M includes the terms "brain" 506-1, "spinal cord" 506-2, and "skull" 506-3 highlighted with highlighting 516 in document portion 504. Virtual note cards 526 or virtual quiz cards 546 may be generated for each of these highlighted terms, examples of which are shown in FIGS. 5N-5O. UI 500-N (FIG. 5N) includes fill-in-the-blank question 556, generated from term "spinal cord" 506-2 and its corresponding definition 511-2, displayed on question side 546-A of a first virtual quiz card 546.

Gesture 564 (e.g., a swipe gesture, FIG. 5N) is detected on touch-sensitive display 112. In response to detection of gesture 564, question side 546-C for a second virtual quiz card 546 is displayed, as shown in FIG. 5O. UI 500-O (FIG. 5O) includes fill-in-the-blank question 566, generated from term "skull" 506-3 and its corresponding definition 511-3, displayed on question side 546-C of a second virtual quiz card 546. Additional swipe gestures may be performed to navigate between the virtual quiz card 546 corresponding to term "spinal cord" 506-2, the virtual quiz card 546 corresponding to term "skull" 506-3, and virtual quiz cards 546 generated from other annotated author-specified terms 506 (e.g., the virtual quiz card 546 corresponding to term "brain" 546-1, not shown).

Thus, when multiple author-specified terms 506 are annotated, multiple virtual quiz cards 546 (or multiple virtual note cards 526) may be generated (e.g., one for each respective annotated author-specified term).

FIGS. 6A-6C are flow diagrams illustrating a method 600 of automatically generating supplemental content in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides a way to automatically generate supplemental content (e.g., a note card or quiz) that is tailored to the user based on the user's annotation of the primary content. The method reduces the cognitive burden on a user when generating supplemental content, thereby creating a more efficient human-machine interface. For battery-operated electronic devices, enabling faster and more efficient generation of supplemental content conserves power and increases the time between battery charges.

The device displays a portion of a document in a primary user interface for the document, the portion of the document including a respective author-specified term (e.g., a key term in a textbook) (602). The respective author-specified term is associated with corresponding additional information supplied by an author of the document (604), and the corresponding additional information is not concurrently displayed with the author-specified term in the portion of the document (606). In some embodiments, the document includes a plurality of author-specified terms that are each associated with corresponding additional information supplied by an author of the document (e.g., definitions for key terms in a glossary).

For example, in FIG. 5A, portion 504 of a document is displayed in a primary user interface for the document on touch-sensitive display 112. Document portion 504 includes one or more author-specified terms 506. The author-specified terms 506 are associated with additional content 510 (FIG. 5B) (e.g., definitions 511). Additional content 510 is not concurrently displayed with the author-specified terms 506 in the portion of the document 504.

In some embodiments, the additional information associated with the respective author-specified term is not accessible in the primary user interface (e.g., the additional information is metadata for the document that is not displayed in the primary user interface) (608). For example, additional content 510 may be metadata for the document that includes document portion 504 and is normally inaccessible to the user.

In some embodiments, the additional information associated with the respective author-specified term is accessible in the primary user interface (e.g., the additional information appears in a different portion of the document such as a glossary at the end of the document or chapter) (610). For example, additional content 510 (FIG. 5B) may be located at the end of the document that includes document portion 504.

In some embodiments, the additional information associated with the respective author-specified term is a definition of the respective author-specified term in a glossary in the document (612). For example, additional content 510 (FIG. 5B) includes a respective definition 511, which may be part of a glossary for the document that includes document portion 504, corresponding to an author-specified term 506.

In some embodiments, the respective author-specified term is displayed in the primary user interface so as to visually distinguish the respective author-specified term from other terms in the document (e.g., so as to emphasize the respective author-specified term) (614). In other words, the display characteristics of the author-specified term are different from display characteristics of other terms in the document. For example, the author-specified terms are bold terms, underlined terms, highlighted terms, terms with a larger font size than the default font size, terms with different colored text or backgrounds, and/or terms formatted as part of a list or as bullet points, etc. For example, in FIG. 5A, author-specified terms 506 are displayed in boldface.

The device receives (from a user of the electronic device) a request to annotate the respective author-specified term in the portion of the document (616). In some embodiments, the request to annotate the respective author-specified term is a request to highlight the respective author-specified term in the primary user interface (618). For example, in FIG. 5C, the request to annotate (specifically, highlight) author-specified term "spinal cord" 506-2 is in the form of gesture 512. In response to detection of gesture 512, the text "The spinal cord carries nerve impulses" is highlighted with highlighting 516 (FIG. 5D).

In some embodiments, the request to annotate the respective author-specified term is a request to annotate a plurality of contiguous terms including one or more terms that are not author-specified terms in addition to the author-specified term (620). In some embodiments, all of the terms in the plurality of contiguous terms are displayed in a supplemental user interface (described further below) (e.g., a note card for the respective author-specified term includes the other terms that were highlighted along with the author-specified term, so as to provide the user with context for the term in the supplemental user interface). For example, in FIG. 5C, gesture 512 is a request to annotate (e.g., highlight) term "spinal cord" 506-2 as well as one or more non-author-specified terms (e.g., "The," "carries nerve impulses") that are contiguous with "spinal cord" 506-2. In response to detection of gesture 512, the text "The spinal cord carries nerve impulses" is annotated, and all of annotated terms are later displayed in a note card (FIG. 5F).

In response to the request to annotate the respective author-specified term (622), the device annotates the respective author-specified term in the primary user interface (624), and generates instructions for displaying, in a supplemental user interface for the document distinct from the primary user interface, the respective author-specified term and at least a portion of the corresponding additional information for the respective author-specified term (626). For example, in response to detection of gesture 512 (FIG. 5C), author-specified term "spinal cord" 506-2 is annotated (e.g., highlighted) (FIG. 5D), and a supplemental user interface, including highlighted author-specified term 506-2 and content generated from corresponding definition 511-2, along with corresponding instructions for displaying the supplemental user interface, is generated.

In some embodiments, the instructions for displaying the supplemental user interface are generated automatically, without user intervention. In some embodiments, a supplemental user interface is a user-customized, user-specified, and/or user-defined interface that is generated based at least in part on input from a user (e.g., the request to annotate the respective author-specified term), while the primary user interface is an author-specified user interface that is generated without input from the user (e.g., a standard textbook interface with a layout that is defined by an author/publisher of the textbook). In some embodiments, the instructions for displaying the supplemental user interface are stored with instructions for generating the primary user interface and the supplemental user interface is accessible via the primary user interface (e.g., by selecting a link on the primary user interface). While the supplemental user interface is described herein as a supplemental user interface for the document, it should be understood that the supplemental user interface could also include author-specified terms and additional information associated with other documents (e.g., virtual note cards or user-customized quizzes including terms from a plurality of different textbooks and/or other electronic references for a single student).

In some embodiments, the supplemental user interface includes a virtual note card (628) (e.g., a user interface that includes the author-defined term on a "front" of the card and the additional information associated with the author-defined term on a "back" of the card, where the user can switch from displaying the front of the card to displaying the back of the card by performing a predefined operation in the supplemental user interface (e.g., a tap gesture on a "flip note card" button in the supplemental user interface, or a swiping gesture across the virtual note card). For example, in FIGS. 5F-5H, the supplemental user interface is virtual note card 526, which may include "front" side 526-A and "back" side 526-B. The user may switch from displaying "front" side 526-A to displaying "back" side 526-B, and vice versa, by performing a tap gesture on flip icon 528.

In some embodiments, the supplemental user interface includes a user-customized quiz including the respective author-specified term and a portion of the corresponding additional information (e.g., the user-customized quiz includes the author-specified term as part of a question and the corresponding additional information as an answer, or the user-customized quiz includes the corresponding additional information as a question and the author-specified term as part of the answer) (630). For example, in FIGS. 5J-5L, 5N-5O, the supplemental user interface is virtual quiz card 546. The question may be, for example, a fill-in-the-blank question (e.g., question 556), where the author-specified term is part of the question and the answer includes parts of the corresponding definition; or a multiple choice question (e.g., question 560) where the question includes the corresponding definition information and the author-specified term is an answer choice.

In some embodiments, the user-customized quiz includes one or more author-specified terms in addition to the respective author-specified term (632). For example, the user-customized quiz may include multiple questions, each corresponding to a different author-specified term. As another example, the user-customized quiz may be a multiple choice or definition matching quiz, and other author-specified terms are used as alternative answers to the question associated with the author-specified term. For example, in FIG. 5L, multiple-choice question 560 includes author-specified terms 506-2, 506-4, and 506-n as answer choices.

In some embodiments, the device detects a predefined gesture at a location on the touch-sensitive surface that corresponds to a location of the respective author-specified term in the primary user interface for the document (e.g., a predefined gesture that is different from user input that corresponds to the request to annotate the respective author-specified term) (634), and in response to detecting the gesture, displays the respective additional information associated with the respective author-specified term in the primary user interface (636). For example, in response to a tap and hold gesture (e.g., gesture 518, FIG. 5D) on the respective author-specified term (e.g., term "spinal cord" 506-2, FIG. 5D-5E), an author-provided definition (e.g., definition 511, FIG. 5E) for the author-specified term (e.g., term "spinal cord" 506-2, FIG. 5D-5E) is displayed on the display (e.g., in a pop-up window, such as pop-up 520).

In some embodiments, the device receives a request to display the supplemental user interface associated with the document (638). As one example, the request is selection of a button or menu item in the primary user interface for the document. In response to the request, the device displays the supplemental user interface (640).

For example, in FIGS. 5E-5F, in response to detection of gesture 522 on "Notes" icon 508, virtual note card 526 is displayed. As another example, in FIGS. 5I-5J, in response to detection of gesture 544 on "Quiz" icon 542, virtual quiz card 546 is displayed.

In some embodiments, the device displays the supplemental user interface (642); receives a request to modify the supplemental user interface (e.g., add notes or other user specified text and/or modify the additional information, etc.) (644); and in response to the request to modify the supplemental user interface, modifies the supplemental user interface in accordance with the request to modify the supplemental user interface (646). In other words, in some embodiments, the electronic device automatically creates a draft note card or user-customized quiz and the user of the device is able to display the draft note card or user-customized quiz and modify the draft note card or quiz to suit the user's own personal preferences. For example, FIGS. 5G-5H, while virtual note card 526 is displayed, edit mode may be activated in response to detection of gesture 534 on "Edit note" icon 530. While in edit mode, user-entered text 536 may entered by the user into virtual note card 526. User-entered text 536 is saved into virtual note card 526 in response to detection of a gesture on "Save" icon 538.

In some embodiments, the user has annotated a plurality of author-specified terms in the primary user interface (648), and the supplemental user interface includes information corresponding to multiple distinct author-specified terms that have been annotated in the primary user interface (650) (e.g., the supplemental user interface includes a user-customized quiz with questions related to multiple terms highlighted by the user or a set of note cards where each note card corresponds to a different term highlighted by the user while reviewing the textbook in the primary user interface). For example, in FIGS. 5M-5O, author-specified terms 506-1, 506-2, and 506-3 are highlighted. Multiple virtual note cards 526 are generated, each corresponding to a respective highlighted author-specified term (e.g., "front" side 546-A for a virtual note card corresponding to term "spinal cord" 506-2 in FIG. 5N and "front" side 546-C for another virtual note card corresponding to term "skull" 506-3 in FIG. 5O).

Figure 7:
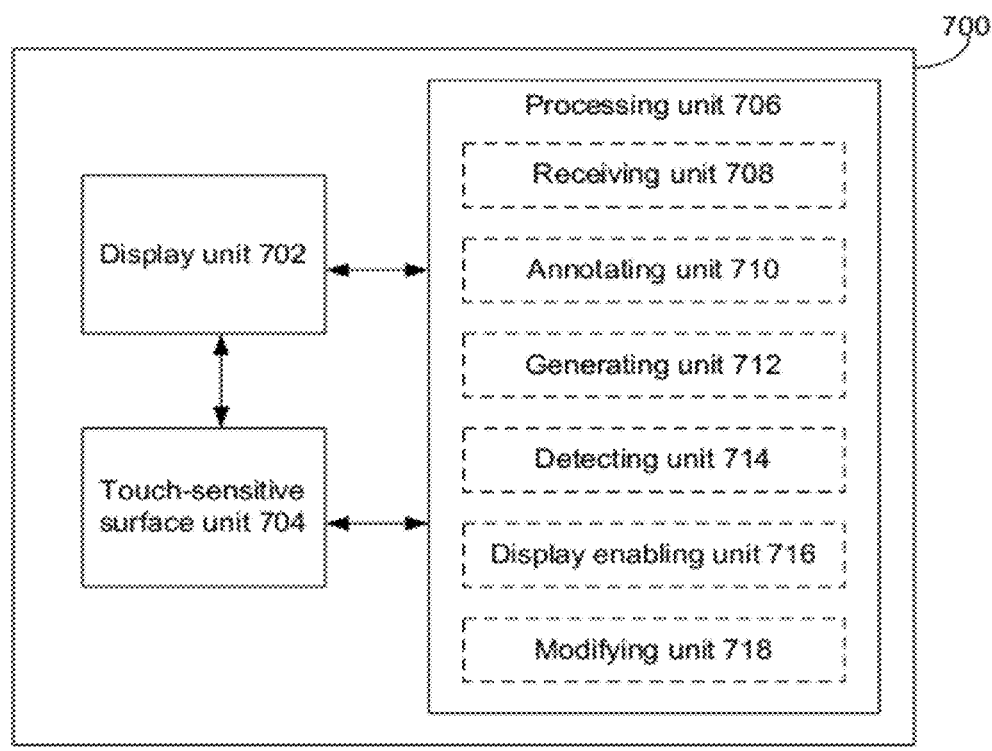
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display a portion of a document in a primary user interface for the document, the portion of the document including a respective author-specified term, where the respective author-specified term is associated with corresponding additional information supplied by an author of the document, and the corresponding additional information is not concurrently displayed with the author-specified term in the portion of the document; a touch-sensitive surface unit 704 configured to receive user gestures; and a processing unit 706 coupled to the display unit 702 and the touch-sensitive surface unit 704. In some embodiments, the processing unit 706 includes a receiving unit 708, an annotating unit 710, a generating unit 712, a detecting unit 714, a display enabling unit 716, and a modifying unit 718.

The processing unit 706 is configured to receive a request to annotate the respective author-specified term in the portion of the document (e.g., with the receiving unit 708); and in response to the request to annotate the respective author-specified term: annotate the respective author-specified term in the primary user interface (e.g., with the annotating unit 710), and generate instructions for displaying, in a supplemental user interface for the document distinct from the primary user interface, the respective author-specified term and at least a portion of the corresponding additional information for the respective author-specified term (e.g., with the generating unit 712).

In some embodiments, the additional information associated with the respective author-specified term is not accessible in the primary user interface.

In some embodiments, the additional information associated with the respective author-specified term is accessible in the primary user interface.

In some embodiments, the additional information associated with the respective author-specified term is a definition of the respective author-specified term in a glossary in the document.

In some embodiments, the request to annotate the respective author-specified term is a request to highlight the respective author-specified term in the primary user interface.

In some embodiments, the request to annotate the respective author-specified term is a request to annotate a plurality of contiguous terms including one or more terms that are not author-specified terms in addition to the author-specified term.

In some embodiments, the processing unit 706 is configured to: detect a predefined gesture at a location on the touch-sensitive surface unit 704 that corresponds to a location of the respective author-specified term in the primary user interface for the document (e.g., with the detecting unit 714), and in response to detecting the gesture, enable display of the respective additional information associated with the respective author-specified term in the primary user interface (e.g., with the display enabling unit 716).

In some embodiments, the processing unit 706 is configured to: receive a request to display the supplemental user interface associated with the document (e.g., with the receiving unit 708); and in response to the request, enable display of the supplemental user interface (e.g., with the display enabling unit 716).

In some embodiments, the processing unit 706 is configured to: enable display of the supplemental user interface (e.g., with the display enabling unit 716); receive a request to modify the supplemental user interface (e.g., with the receiving unit 708); and in response to the request to modify the supplemental user interface, modify the supplemental user interface in accordance with the request to modify the supplemental user interface (e.g., with the modifying unit 718).

In some embodiments, the supplemental user interface includes a virtual note card.

In some embodiments, the supplemental user interface includes a user-customized quiz including the respective author-specified term and a portion of the corresponding additional information.

In some embodiments, the user-customized quiz includes one or more author-specified terms in addition to the respective author-specified term.

In some embodiments, the user has annotated a plurality of author-specified terms in the primary user interface, and the supplemental user interface includes information corresponding to multiple distinct author-specified terms that have been annotated in the primary user interface.

In some embodiments, the respective author-specified term is displayed in the primary user interface so as to visually distinguish the respective author-specified term from other terms in the document.

The operations described above with reference to FIGS. 6A-6C may be implemented by components depicted in FIGS. 1A-1B. For example, receiving operation 616, annotating operation 624, and generating operation 626 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
      displaying a portion of a document in a primary user interface for the document, the portion of the document including a respective author-specified term, wherein:
         the respective author-specified term is associated with corresponding additional information supplied by an author of the document; and
         the corresponding additional information is not concurrently displayed with the author-specified term in the portion of the document;
      receiving a request to annotate the respective author-specified term in the portion of the document; and
      in response to the request to annotate the respective author-specified term:
         annotating the respective author-specified term in the primary user interface; and
         generating instructions for displaying, in a supplemental user interface for the document distinct from the primary user interface, the respective author-specified term and at least a portion of the corresponding additional information for the respective author-specified term, wherein the supplemental user interface includes a user-customized quiz including the respective author-specified term and a portion of the corresponding additional information.

2. The device of claim 1, wherein the additional information associated with the respective author-specified term is not accessible in the primary user interface.

3. The device of claim 1, wherein the additional information associated with the respective author-specified term is accessible in the primary user interface.

4. The device of claim 1, wherein the additional information associated with the respective author-specified term is a definition of the respective author-specified term in a glossary in the document.

5. The device of claim 1, including instructions for:
   detecting a predefined gesture at a location on the touch-sensitive surface that corresponds to a location of the respective author-specified term in the primary user interface for the document; and
   in response to detecting the gesture, displaying the respective additional information associated with the respective author-specified term in the primary user interface.

6. The device of claim 1, including instructions for:
   displaying the supplemental user interface;
   receiving a request to modify the supplemental user interface; and
   in response to the request to modify the supplemental user interface, modifying the supplemental user interface in accordance with the request to modify the supplemental user interface.

7. The device of claim 1, wherein the supplemental user interface includes a virtual note card.

8. The device of claim 1, wherein:
the user has annotated a plurality of author-specified terms in the primary user interface; and
the supplemental user interface includes information corresponding to multiple distinct author-specified terms that have been annotated in the primary user interface.

9. The device of claim 1, wherein the respective author-specified term is displayed in the primary user interface so as to visually distinguish the respective author-specified term from other terms in the document.

10. A method, comprising:
at an electronic device having a display and a touch-sensitive surface:
displaying a portion of a document in a primary user interface for the document, the portion of the document including a respective author-specified term, wherein:
the respective author-specified term is associated with corresponding additional information supplied by an author of the document; and
the corresponding additional information is not concurrently displayed with the author-specified term in the portion of the document;
receiving a request to annotate the respective author-specified term in the portion of the document; and
in response to the request to annotate the respective author-specified term:
annotating the respective author-specified term in the primary user interface; and
generating instructions for displaying, in a supplemental user interface for the document distinct from the primary user interface, the respective author-specified term and at least a portion of the corresponding additional information for the respective author-specified term, wherein the supplemental user interface includes a user-customized quiz including the respective author-specified term and a portion of the corresponding additional information.

11. The method of claim 10, wherein the additional information associated with the respective author-specified term is not accessible in the primary user interface.

12. The method of claim 10, wherein the additional information associated with the respective author-specified term is accessible in the primary user interface.

13. The method of claim 10, wherein the additional information associated with the respective author-specified term is a definition of the respective author-specified term in a glossary in the document.

14. The method of claim 10, including:
detecting a predefined gesture at a location on the touch-sensitive surface that corresponds to a location of the respective author-specified term in the primary user interface for the document; and
in response to detecting the gesture, displaying the respective additional information associated with the respective author-specified term in the primary user interface.

15. The method of claim 10, including:
displaying the supplemental user interface;
receiving a request to modify the supplemental user interface; and
in response to the request to modify the supplemental user interface, modifying the supplemental user interface in accordance with the request to modify the supplemental user interface.

16. The method of claim 10, wherein the supplemental user interface includes a virtual note card.

17. The method of claim 10, wherein:
the user has annotated a plurality of author-specified terms in the primary user interface; and
the supplemental user interface includes information corresponding to multiple distinct author-specified terms that have been annotated in the primary user interface.

18. The method of claim 10, wherein the respective author-specified term is displayed in the primary user interface so as to visually distinguish the respective author-specified term from other terms in the document.

19. A graphical user interface on an electronic device with a display, a touch-sensitive surface, a memory, and one or more processors to execute one or more programs stored in the memory, the graphical user interface comprising:
a portion of a document in a primary user interface for the document, the portion of the document including a respective author-specified term, wherein:
the respective author-specified term is associated with corresponding additional information supplied by an author of the document; and
the corresponding additional information is not concurrently displayed with the author-specified term in the portion of the document;
wherein:
a request to annotate the respective author-specified term in the portion of the document is received; and
in response to the request to annotate the respective author-specified term:
the respective author-specified term is annotated in the primary user interface; and
instructions are generated for displaying, in a supplemental user interface for the document distinct from the primary user interface, the respective author-specified term and at least a portion of the corresponding additional information for the respective author-specified term, wherein the supplemental user interface includes a user-customized quiz including the respective author-specified term and a portion of the corresponding additional information.

20. A non-transitory computer readable storage medium storing one or more programs, the one or more programs comprising instructions, which when executed by an electronic device with a display and a touch-sensitive surface, cause the device to:
display a portion of a document in a primary user interface for the document, the portion of the document including a respective author-specified term, wherein:
the respective author-specified term is associated with corresponding additional information supplied by an author of the document; and
the corresponding additional information is not concurrently displayed with the author-specified term in the portion of the document;
receive a request to annotate the respective author-specified term in the portion of the document; and
in response to the request to annotate the respective author-specified term:
annotate the respective author-specified term in the primary user interface; and
generate instructions for displaying, in a supplemental user interface for the document distinct from the primary user interface, the respective author-specified term and at least a portion of the corresponding additional information for the respective author-specified term, wherein the supplemental user interface includes a user-customized quiz including the respective author-specified term and a portion of the corresponding additional information.

21. The non-transitory computer readable storage medium of claim 20, wherein the additional information associated with the respective author-specified term is not accessible in the primary user interface.

22. The non-transitory computer readable storage medium of claim 20, wherein the additional information associated with the respective author-specified term is accessible in the primary user interface.

23. The non-transitory computer readable storage medium of claim 20, wherein the additional information associated with the respective author-specified term is a definition of the respective author-specified term in a glossary in the document.

24. The non-transitory computer readable storage medium of claim 20, including instructions which cause the device to:
  detect a predefined gesture at a location on the touch-sensitive surface that corresponds to a location of the respective author-specified term in the primary user interface for the document; and
  in response to detecting the gesture, display the respective additional information associated with the respective author-specified term in the primary user interface.

25. The non-transitory computer readable storage medium of claim 20, including instructions which cause the device to:
  display the supplemental user interface;
  receive a request to modify the supplemental user interface; and
  in response to the request to modify the supplemental user interface, modify the supplemental user interface in accordance with the request to modify the supplemental user interface.

26. The non-transitory computer readable storage medium of claim 20, wherein the supplemental user interface includes a virtual note card.

27. The non-transitory computer readable storage medium of claim 20, wherein:
  the user has annotated a plurality of author-specified terms in the primary user interface; and
  the supplemental user interface includes information corresponding to multiple distinct author-specified terms that have been annotated in the primary user interface.

28. The non-transitory computer readable storage medium of claim 20, wherein the respective author-specified term is displayed in the primary user interface so as to visually distinguish the respective author-specified term from other terms in the document.

* * * * *